US012798091B2

(12) United States Patent
Ahire et al.

(10) Patent No.: US 12,798,091 B2
(45) **Date of Patent: *Nov. 17, 2026**

(54) METHOD FOR GENERATING A SCAN PROTOCOL OF A WORKPIECE

(71) Applicant: GrayMatter Robotics Inc., Gardena, CA (US)

(72) Inventors: Avadhoot L. Ahire, Gardena, CA (US); Rishav Guha, Gardena, CA (US); Satyandra K. Gupta, Los Angeles, CA (US); Ariyan M. Kabir, Los Angeles, CA (US); Sagarkumar J. Panchal, Los Angeles, CA (US); Brual C. Shah, San Pedro, CA (US)

(73) Assignee: GrayMatter Robotics Inc., Gardena, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 18/827,070

(22) Filed: Sep. 6, 2024

(65) Prior Publication Data

US 2024/0424670 A1 Dec. 26, 2024

Related U.S. Application Data

(63) Continuation of application No. 18/389,166, filed on Nov. 13, 2023, now Pat. No. 12,109,703, which is a (Continued)

(51) Int. Cl.
*G06T 1/00* (2006.01)
*B24B 51/00* (2006.01)

(Continued)

(52) U.S. Cl.
CPC ............ *B25J 9/1653* (2013.01); *B24B 51/00* (2013.01); *B25J 9/163* (2013.01); *B25J 9/1664* (2013.01);

(Continued)

(58) Field of Classification Search
CPC ........ B25J 9/1653; B25J 9/163; B25J 9/1664; B25J 9/1679; B25J 9/1697; B25J 11/0065;

(Continued)

(56) References Cited

U.S. PATENT DOCUMENTS

| | | | | |
|---|---|---|---|---|
| 8,237,935 B2 * | 8/2012 | Nygaard | ............ | G01B 11/2433 356/639 |
| 11,295,522 B2 * | 4/2022 | Akman | .................. | G01S 17/42 |

(Continued)

*Primary Examiner* — Robert T Nguyen
(74) *Attorney, Agent, or Firm* — Run8 Patent Group, LLC; Peter Miller

(57) ABSTRACT

A method includes, traversing a laser line scanning sensor over a workpiece to generate a series of scan data according to a first set of scan parameters; assembling the series of scan data into a virtual model; detecting a first hole, defining absence of scan data, in a first region of the virtual model; responsive to the first hole defining a dimension less than a threshold dimension, assigning the first set of scan parameters to the first region; detecting a second hole, in a second region of the virtual model; responsive to the second hole defining a dimension greater than the threshold dimension, defining a second set of scan parameters associated with an increased resolution and assigning the second set of scan parameters to the second workpiece region; and compiling the first and second set of scan parameters into a scan protocol defining a minimum scan cycle duration.

20 Claims, 5 Drawing Sheets

Related U.S. Application Data continuation-in-part of application No. 18/232,275, filed on Aug. 9, 2023, now Pat. No. 11,883,961, which is a continuation-in-part of application No. 18/142,480, filed on May 2, 2023, now Pat. No. 11,938,632, and a continuation-in-part of application No. 18/136,244, filed on Apr. 18, 2023, now Pat. No. 11,820,018, and a continuation-in-part of application No. 18/111,470, filed on Feb. 17, 2023, now Pat. No. 12,049,009, which is a continuation-in-part of application No. 17/829,193, filed on May 31, 2022, now Pat. No. 11,613,014, said application No. 18/136,244 is a continuation-in-part of application No. 17/829, 193, filed on May 31, 2022, now Pat. No. 11,613,014, said application No. 18/142,480 is a continuation-in-part of application No. 17/829,193, filed on May 31, 2022, now Pat. No. 11,613,014, which is a continuation of application No. 17/826,840, filed on May 27, 2022, now Pat. No. 12,370,681.

(51) Int. Cl.

| | |
|---|---|
| ***B25J 9/16*** | (2006.01) |
| ***B25J 11/00*** | (2006.01) |
| ***B25J 13/08*** | (2006.01) |
| ***G06T 7/13*** | (2017.01) |
| ***G06T 7/60*** | (2017.01) |
| ***G06T 19/00*** | (2011.01) |

(52) U.S. Cl.

CPC ........... *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search

CPC ...... B25J 13/085; B25J 19/021; B25J 9/1633; B24B 51/00; B24B 49/12; B24B 49/16; B24B 27/0038; G06T 1/0014; G06T 7/13; G06T 7/60; G06T 19/00; G06T 2207/10024; G06T 2219/004; G06T 2219/2021; G06T 19/20; G05B 2219/40586; G05B 2219/40607; G05B 2219/45082

See application file for complete search history.

(56) References Cited

U.S. PATENT DOCUMENTS

| | | | | |
|---|---|---|---|---|
| 12,109,703 | B2 * | 10/2024 | Ahire | B24B 27/0038 |
| 2010/0332196 | A1 * | 12/2010 | Fisker | G06T 17/00 703/1 |
| 2020/0171620 | A1 * | 6/2020 | Aubin | B24B 49/12 |
| 2022/0288774 | A1 * | 9/2022 | Gong | B25J 9/1664 |

* cited by examiner

METHOD FOR GENERATING A SCAN PROTOCOL OF A WORKPIECE

CROSS-REFERENCE TO RELATED APPLICATIONS

This Application is a continuation of U.S. application Ser. No. 18/389,166, filed on 13 Nov. 2023, which is a continuation-in-part of U.S. application Ser. No. 18/232,275, filed on 9 Aug. 2023, which is a continuation-in-part of U.S. application Ser. No. 18/111,470, filed on 17 Feb. 2023, Ser. No. 18/136,244, filed on 18 Apr. 2023, and Ser. No. 18/142,480, filed on 2 May 2023, each of which is a continuation-in-part of U.S. application Ser. No. 17/829,193, filed on 31 May 2022, which is a continuation of U.S. application Ser. No. 17/826,840, filed on 27 May 2022, each of which is incorporated in its entirety by this reference.

This Application is related to U.S. application Ser. No. 17/826,840, filed on May 27, 2022, U.S. application Ser. No. 18/136,241, filed on 18 Apr. 2023, U.S. application Ser. No. 18/136,244, filed on 18 Apr. 2023, U.S. application Ser. No. 18/126,941, 27 Mar. 2023, and U.S. application Ser. No. 18/142,480, filed on 2 May 2023, each of which is incorporated in its entirety by this reference.

TECHNICAL FIELD

This invention relates generally to the field of automated finishing and more specifically to a new and useful system and method for autonomously scanning, processing, and modeling a workpiece in the field of automated finishing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
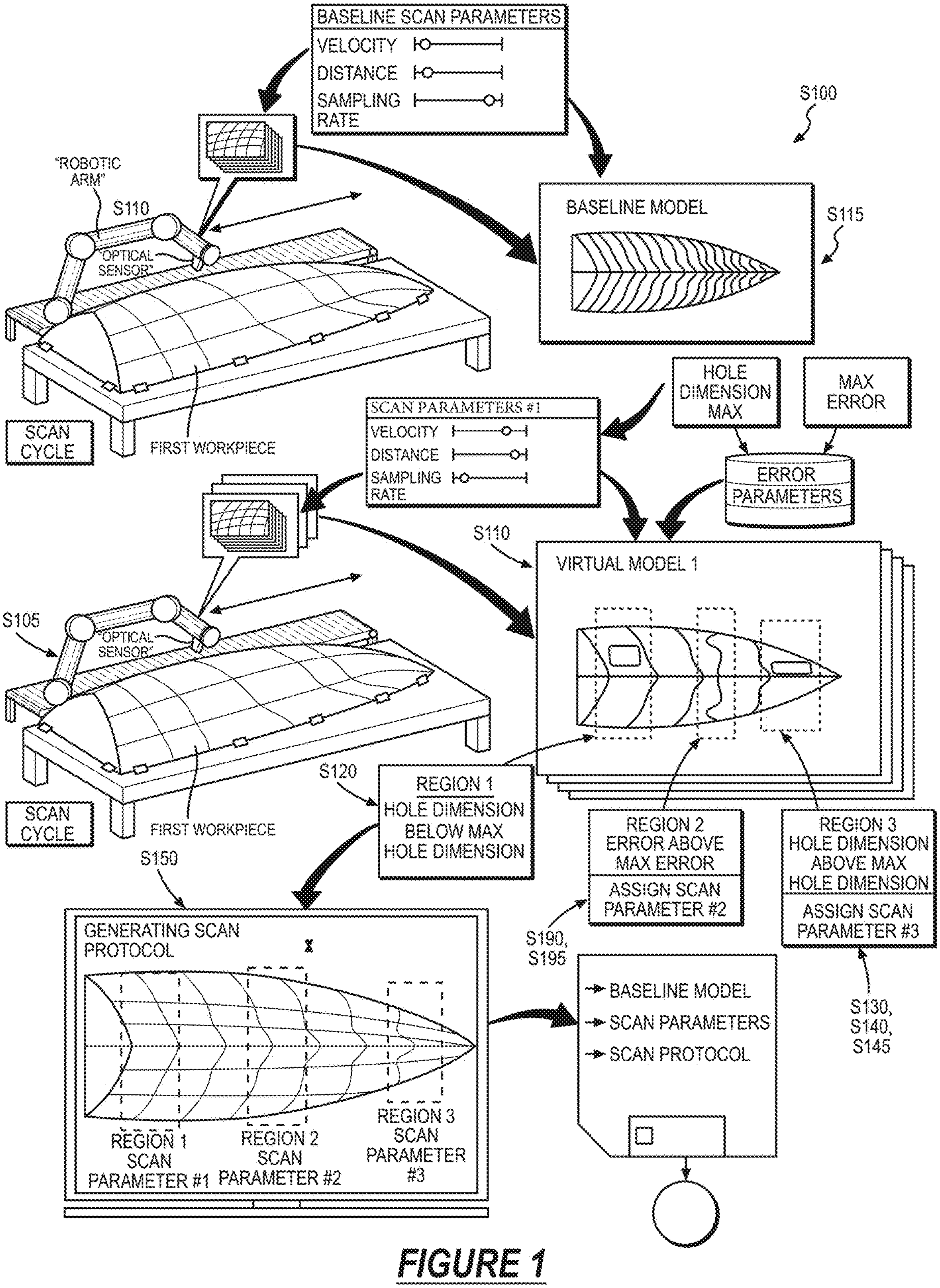
FIG. 1 is a flowchart representation of a one variation of a method.
Figure 2:
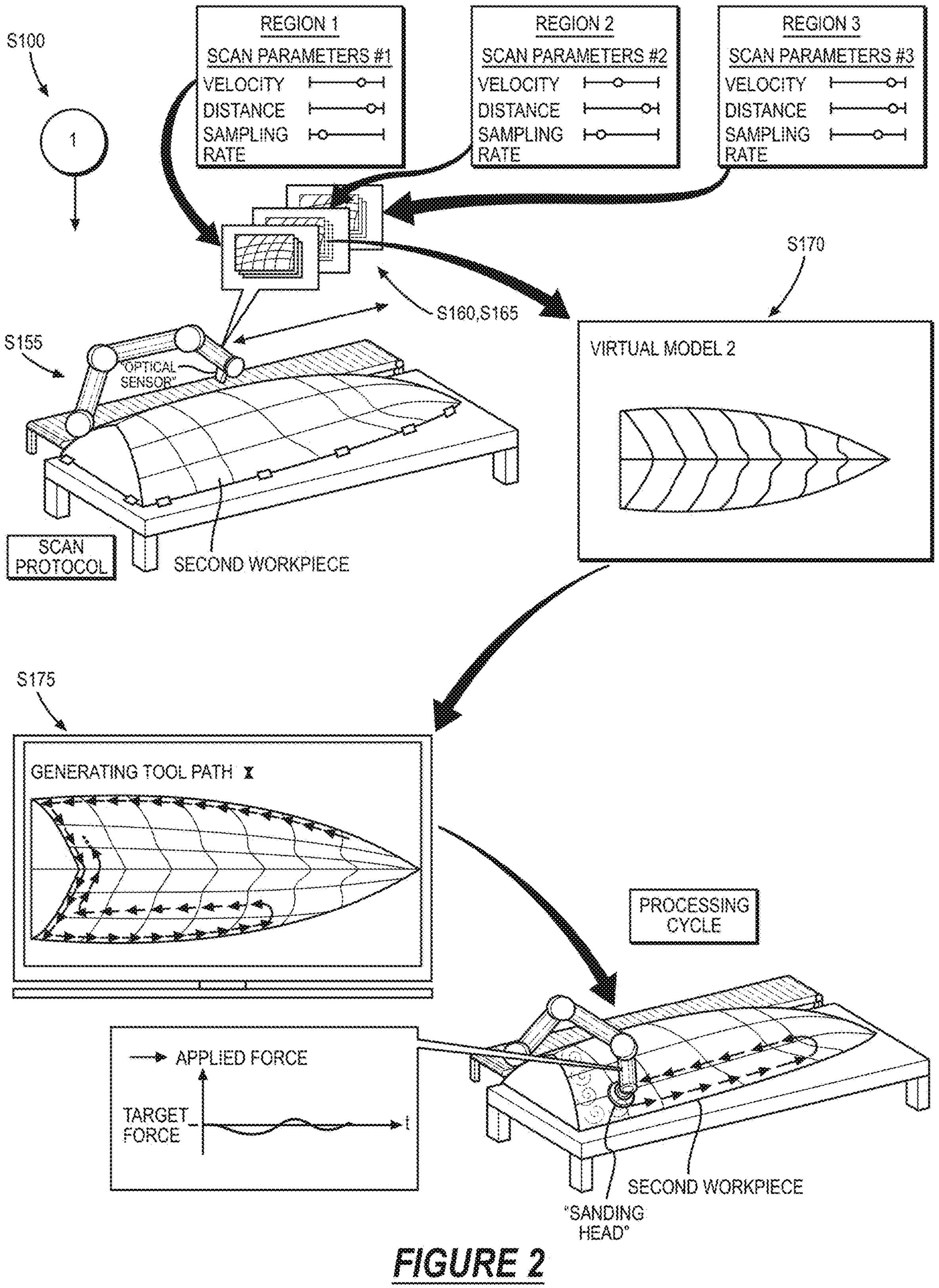
FIG. 2 is a flowchart representation of one variation of the method.
Figure 4:
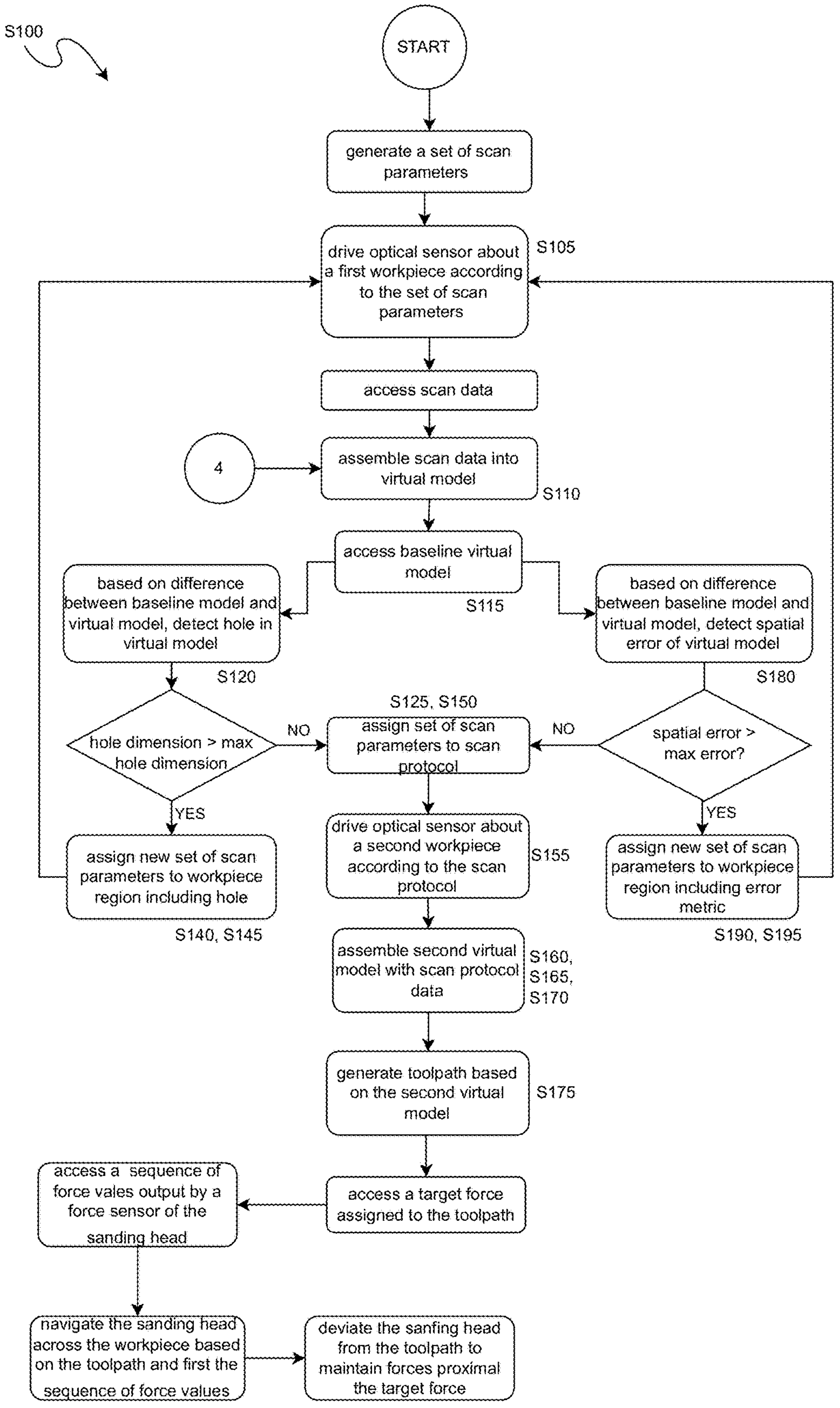
FIG. 4 is a flowchart representation of one variation of the method.

As shown in FIGS. 1, 2, and 4, a method S100 for autonomously scanning and processing a workpiece includes, during a first time interval: during a first scan of a first workpiece approximating a workpiece geometry, driving a set of actuators to traverse a laser line scanning sensor along a scan axis over the first workpiece loaded into a work zone in Block S105; accessing a first series of scan data captured by the laser line scanning sensor, according to a first set of scan parameters, during the first scan; assembling the first series of scan data into a first virtual model characterized by a first resolution in Block S110; accessing a baseline virtual model, of the workpiece, characterized by a baseline resolution greater than the first resolution in Block S115; detecting a first virtual hole, defining absence of scan data, in a first region of the first virtual model in Block S120; in response to the first virtual hole defining a first dimension less than a threshold hole dimension, assigning the first set of scan parameters to the first workpiece region of the workpiece in Block S125; detecting a second virtual hole, defining absence of scan data, in a second region of the first virtual model in Block S130; confirming absence of a second real hole in a second workpiece region of the workpiece, corresponding to the second virtual hole, based on the baseline virtual model in Block S135; in response to the second virtual hole defining a second dimension greater than the threshold hole dimension, defining a second set of scan parameters associated with a second resolution greater than the first resolution and less than the baseline resolution in Block S140 and assigning the second set of scan parameters to the second workpiece region of the workpiece in Block S145; and compiling the first set of scan parameters for the first workpiece region and the second set of scan parameters for the second workpiece region into a scan protocol in Block S150.

The method S100 further includes, during a second time interval shorter than the first time interval: during a second scan of a second workpiece approximating the workpiece geometry, driving the set of actuators to traverse the laser line scanning sensor along the scan axis over the second workpiece loaded into the work zone according to the scan protocol in Block S155; accessing a second series of scan data captured by the laser line scanning sensor, according to the first set of scan parameters while traversing the first workpiece region of the second workpiece in Block S160; accessing a third series of scan data captured by the laser line scanning sensor, according to the second set of scan parameters while traversing the second workpiece region of the second workpiece in Block S165; assembling the second series of scan data and the third series of scan data into a second virtual model of the second workpiece in Block S170; and generating a first toolpath indicating a trajectory of a tool (e.g., a sanding head) across the second workpiece based on the second virtual model in Block S175.

1.1 Variation: Detecting Geometric Error

Figure 5:
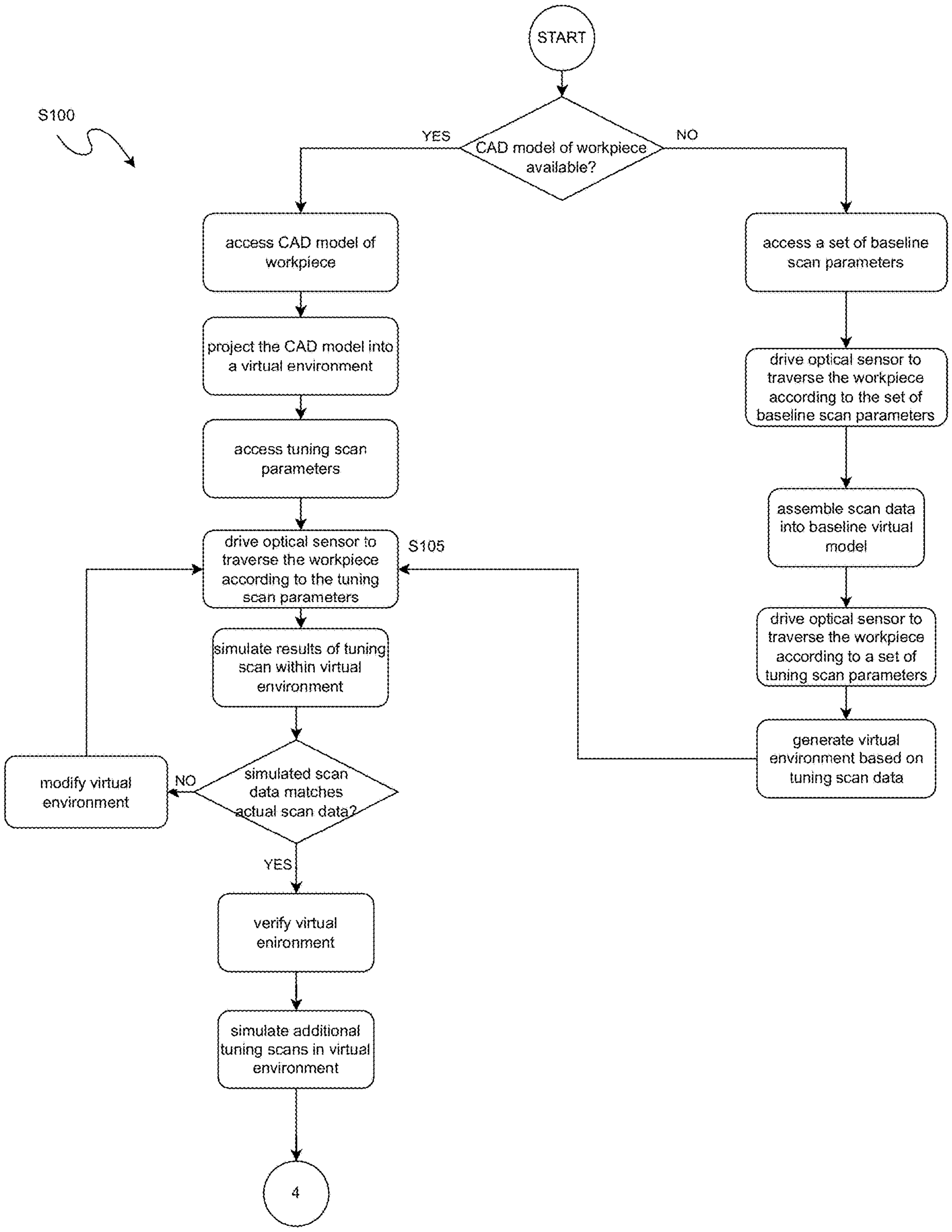
FIG. 5 is a flowchart representation of one variation of the method.

One variation of the method S100 shown in FIG. 5 generates the scan protocol by quantifying an error metric of each scan executed according to a set of scan parameters. This variation of the method S100 includes, during a setup period: during a first scan of a first workpiece approximating a workpiece geometry, driving a set of actuators to traverse a laser line scanning sensor along a scan axis over the first workpiece loaded into a work zone in Block S105; accessing a first series of scan data captured by the laser line scanning sensor, according to a first set of scan parameters, during the first scan; assembling the first series of scan data into a first virtual model characterized by a first resolution in Block S110; accessing a baseline virtual model, of the workpiece, characterized by a baseline resolution greater than the first resolution in Block S115; detecting a first error metric, defining variability of the first series of scan data, in a first region of the first virtual model in Block S180; in response to the first error metric of the first region less than an error threshold, assigning the first set of scan parameters to the first workpiece region of the workpiece in Block S185; detecting a second error metric, defining variability of the first series of scan data, in a second region of the first virtual model in Block S190; in response to the second error metric of the second region greater than the error threshold, defining a second set of scan parameters associated with a second resolution greater than the first resolution and less than the baseline resolution and assigning the second set of scan parameters to the second workpiece region of the workpiece in Block S195; and compiling the first set of scan parameters for the first workpiece region and the second set of scan parameters for the second workpiece region into a scan protocol in Block S150.

This variation of the method S100 further includes, during a second time interval shorter than the first time interval: during a second scan of a second workpiece approximating the workpiece geometry, driving the set of actuators to traverse the laser line scanning sensor along the scan axis over the second workpiece loaded into the work zone according to the scan protocol in Block S155; accessing a second series of scan data captured by the laser line scanning sensor, according to the first set of scan parameters while traversing the first workpiece region of the second workpiece in Block S160; accessing a third series of scan data captured by the laser line scanning sensor, according to the second set of scan parameters while traversing the second workpiece region of the second workpiece in Block S165; assembling the second series of scan data and the third series of scan data into a second virtual model of the second workpiece in Block S170; and generating a first toolpath indicating a trajectory of a sanding head across the second workpiece based on the third virtual model in Block S175.

1.2 Variation: Processing Cycle

Figure 3:
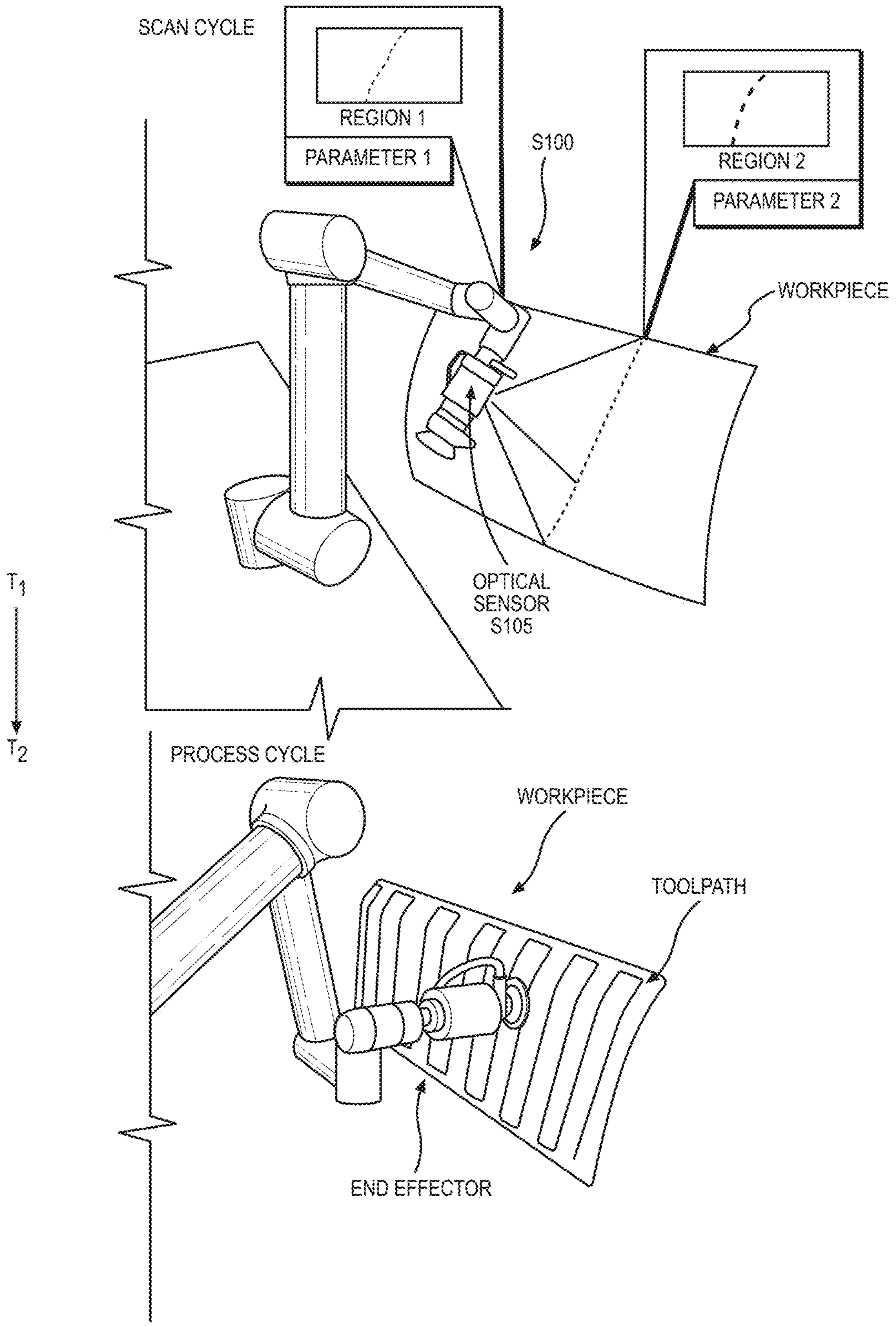
FIG. 3 is a flowchart representation of one variation of the method.

As shown in FIG. 3, one variation, of the method S100 further includes, during a processing cycle: accessing a nominal target force assigned to the first toolpath; accessing a first sequence of force values output by a force sensor coupled to the sanding head; and via the set of actuators, navigating the sanding head across the second workpiece according to the first toolpath and based on the first sequence of force values, deviating the sanding head from the first toolpath to maintain forces, applied by the sanding head to the workpiece, proximal the nominal target force.

2. Applications

Generally, an autonomous scanning (hereinafter the "system") can execute Blocks of the method S100 to: receive a first workpiece within a work zone; execute multiple scans—characterized by various scan parameters—of a first workpiece over an extended time duration (e.g., hours); assemble data captured during these scans into virtual models of the workpiece; characterize error in these virtual models (e.g., hole size, dimensional error); tune scan parameters to yield less than an error threshold (e.g., maximum whole size, maximum dimensional error) within a shortened time duration (e.g., seconds or minutes); and store these scan parameters in association with a geometry or type of the first workpiece.

Later, when a second workpiece of the same or similar geometry or type of the first workpiece is loaded into work zone, the system can: execute a scan over the second workpiece—within the shortened time duration—according to the scan parameters in association with the geometry or type of the first workpiece; assemble the scan data into a virtual model of the first workpiece; generate a toolpath for the second workpiece based on a geometry represented in the virtual model (or align a predefined toolpath to the second workpiece based a on geometry represented in virtual model); and execute the toolpath to autonomously sand (or grind, buff, polish) the second workpiece.

Therefore, the system can execute Blocks of the method S100 to: autonomously derive scan parameters that yield a virtual model exhibiting equivalent or improved error and limit (e.g., reduce, minimize) scan duration for a workpieces of a particular geometry based on scan data captured during an extended scan cycle of a first workpiece of this geometry; and then, autonomously implement these scan parameters to rapidly scan (many) additional workpieces of the same or similar geometry and assemble the scan data into virtual models of sufficient resolution and error to define toolpaths executable by the system to accurately and repeatably sand, grind, buff, and/or polish surfaces of these workpieces to consistent, target surface finishes.

In one implementation, the system scans and processes (e.g., sands, buffs, polishes etc.) a set of workpieces defining a common geometry. For a first workpiece, the system can execute a baseline scan cycle to capture a set of baseline scan data and compile the data into a high-resolution baseline virtual model. The baseline scan cycle can define a multiple hour duration and include dozens or hundreds of scans to capture a scan data set to accurately represent the geometry (e.g., the surface contour) of the workpiece.

During the baseline scan, the system generates sets of scan parameters to empirically capture scan data of the workpiece and identify scan parameters that generate scan data most accurately representing the workpiece. The system then generates a scan protocol defining a limited set of scans and corresponding scan parameters executable by the system to scan a second workpiece—of a similar geometry—during a subsequent scan cycle to capture scan data assemblable into a virtual model that represents the workpiece with less than a threshold error (e.g., holes small than a maximum hole size, geometry error less than a maximum geometry error or tolerance).

More specifically, the system can: execute many scans—with different combinations of scan parameters—of a first workpiece over an extended time duration (e.g., hours); and compile scan data captured during these scans into virtual models representing the workpiece at different resolutions and with different error (e.g., missing data or "hole," geometric accuracy) characteristics. Based on these initial scan results and virtual model error characteristics, the system can then define a limited number of scans and corresponding scan parameters that—when executed by the system (or a similar system) over another workpiece of the same or similar geometry—yield sufficient scan data to assemble a virtual model characterized by less than the threshold error within a limited scan duration (e.g., seconds or minutes) and with limited computational resources (e.g., by avoiding processing more data than necessary to create a virtual model of sufficient accuracy). The system can thus store scan parameters of these limited number of scans in a scan protocol associated with the geometry of the first workpiece.

For a second workpiece defining the same or similar geometry and processed by the system (or by a similar system), the system can execute the scan protocol to capture optical scan data—representing the second workpiece—within a limited time duration and assemblable into a virtual model of the second workpiece with limited computational resources. The system then assembles the scan data of the scan protocol into a virtual model of each workpiece, the virtual model exhibiting a resolution within a target minimum resolution range (e.g., exhibiting an error and hole size within a threshold error or hole size).

2.1 Partial Simulation

In one variation, the system: navigates the laser line scanning sensor about a first instance of a workpiece according to a set of scan parameters to capture scan data characterizing the geometry of the workpiece; and simulates the scan within a virtual environment including a virtual model of the workpiece to generate simulated scan data. In response to the simulated scan data not matching the scan data, the system adjusts boundary conditions of the virtual environment to align the simulated scan data with the scan data. In response to the simulated scan data matching the scan data, the system: validates the simulation; executes a set of simulated scans within the virtual environment to capture simulated scan data for a range of scan parameters; generates the scan protocol based on the simulated scan data; and executes the scan protocol on the workpiece.

For example, the system: executes a limited set of scans via traversing the laser line scanning sensor about the workpiece; generates a virtual environment based on the scan data associated with the limited set of scan; simulates many (e.g., hundreds, thousands) additional scans to generate the scan protocol; and stores the scan protocol for scanning of another instance of the workpiece defining the same geometry as the first instance. Therefore, the system can virtually simulate scans of the first instance of the workpiece to generate the scan protocol via simulation more quickly than via physically scan the workpiece.

2.2 Scanning Protocol Tuning Via Simulation

Further, the system leverages simulated scans to correct a scan protocol in real-time. For example, the system can scan a set of 25 workpieces defining a common geometry. However, during scanning of the set of workpieces, the external environment around the system may exhibit geometric and/or lighting changes such as objects in the environment moving and/or an intensity of light entering a window in the virtual environment increasing or decreasing. Therefore, during scanning of the $23^{rd}$ workpiece of the common geometry, the system can: partially execute the scan protocol cycle; and detect an error of the set of scan data above a threshold error due to the change in the external environment. The system then: simulates the scan protocol within the virtual environment; and, based on a difference of the simulated scan data and expected scan data (e.g., data gathered from the first 22 scan protocol cycles), modify the virtual environment (e.g., add a virtual light source, recalculate a position of the laser line scanning sensor within the virtual environment) to align the simulated scan data within a threshold error of the expected scan data. Then, based on the modifications of the virtual environment, the system: updates the scan protocol to change the set of scan parameters represented within the scan protocol; and executes the updated scan protocol on the $23^{rd}$ workpiece. Therefore, the system can generate updated scan parameters based on the virtual environment to maintain the scan data within a threshold error.

2.3 Sanding Definition

The system is configured to execute the Blocks of the method S100 to: autonomously scan a workpiece; generate a toolpath based on the scan data; and traverse a sanding head across a workpiece according to the toolpath to abrasively remove material. As used herein, the term "sanding" is equivalent to abrasive material removal and can include processes such as grit sanding, grinding, buffing, polishing.

3. System

In one implementation, shown in FIG. 1, the system includes: a robotic arm arranged in or adjacent a work zone and including a set of articulatable joints interposed between a series of arm segments; an end effector supported on a distal end of the robotic arm; a laser line scanning sensor (e.g., a laser scanner) arranged on or integrated into the end effector and configured to capture optical images (e.g., depth maps) of a workpiece; a position sensor configured to output signals representing (or assemblable into) a three-dimensional position of the laser line scanning sensor; a display configured to render a user interface accessible by an operator; and/or a controller configured to execute Blocks of the method S100.

In this implementation, the system can also include a conveyor configured to traverse the robotic arm longitudinally along the work zone, such as to reach and process an elongated part defining a high length-to-width ratio (e.g., a high aspect ratio), such as a boat hull or aircraft wing.

In one implementation, a laser line scanning sensor is configured to: project a laser (e.g., a spot, line, array of points) onto the workpiece; capture scan data of the laser projection on the surface of the workpiece; and derive a surface contour of the workpiece based on distortions of the laser projection on the surface of the workpiece.

The system includes a position sensor configured to detect a position of the laser line scanning sensor. For example, the system: includes a one-, two-, or three-dimensional LIDAR sensor, a time-of-flight distance sensor, a stereoscopic camera, a depth sensor, and/or color camera, etc. arranged facing the robotic arm to detect a position of the laser line scanning sensor. The system can access one-dimensional distances or two- or three-dimensional images output by these sensors; and can derive and track three-dimensional positions of the laser line scanning sensor along the track.

In another implementation, the conveyor and the joints of the robotic arm can include positional encoders (e.g., magnetic encoders configured to output a signal corresponding to a position of the robotic arm on the conveyor or the angular position of the joint of the robotic arm. The system can compile the set of encoder signals to derive a position of the end effector and therefore the laser line scanning sensor. However, the system can implement any other method or technique to track three-dimensional positions of the robotic arm, laser line scanning sensor, and/or a reference point during a scanning or processing cycle.

In one implementation, the system can locate and articulate an end effector (e.g., a sanding head) according to the method described in U.S. patent application Ser. No. 18/232,275, filed on 9 Aug. 2023.

The controller: triggers the actuators of the system to traverse the laser line scanning sensor proximal the workpiece; and triggers the laser line scanning sensor to capture scan data to complete a scan. Herein, a scan defines a single "pass" of the laser line scanning sensor about a scan path, while scan data includes the scan data captured by the laser line scanning sensor along that scan path according to a set of scan parameters. A scan cycle defines a set of scans and a set of corresponding scan data captured during the set of scans. The system: compiles the scan data into a virtual model of the workpiece defining a target resolution (e.g., exhibiting an error and hole size within a threshold error or hole size).

For example, the system can execute a baseline scan cycle to generate a baseline model defining a maximal resolution. The baseline scan cycle includes dozens, or hundreds of scans characterized by dozens or hundreds of permutations of scan paths and sets of scan parameters. The system then: compiles the scan data from the set of scans included in the baseline scan cycle; and assembles a baseline virtual model of the workpiece defining the maximal resolution. The system can also execute a scan cycle to generate a virtual model defining a resolution less than the maximal resolution of the baseline virtual model. For example, the system can execute a scan protocol to capture a set of data to generate a virtual model representing the workpiece defining a minimal resolution. The scan protocol includes two to 20 scans to capture the data for the virtual model.

4. Laser Line Scanning Sensor Scan Parameters

The laser line scanning sensor is configured to capture scan data of a workpiece loaded into the work zone. The system actuates the laser line scanning sensor and captures scan data via the laser line scanning sensor according to a set of scanning parameters. The set of scanning parameters can include: a scan path; an orientation of the laser line scanning sensor; an actuation velocity of the laser line scanning sensor; a frequency (e.g., a color) of light emitted by the laser line scanning sensor toward the workpiece; an exposure; a sample area; a sampling density; and active area/spot selection.

4.1 Scan Path

The set of scan parameters can include a scan path defining a trajectory of the laser line scanning sensor during the scan. The scan path can define an initial position, a final position, and a trajectory between the initial and final positions. The controller triggers the set of actuators to drive the laser line scanning sensor to traverse the scan path. The scan path can include a set of coordinates for traversal by the laser line scanning sensor. The scan path can define an area of the workpiece for which the laser line scanning sensor can capture data.

In one implementation, the scan path defines a linear trajectory between a three-dimensional initial coordinate and a three-dimensional final coordinate. The scan path can additionally be limited to change in direction in a single axis. For example, the scan path can define a set of co-linear coordinates for traversal by the laser line scanning sensor such that the robotic arm drives the laser line scanning sensor along a horizontal path (e.g., defining a constant vertical coordinate). Therefore, the laser line scanning sensor captures scan data along the scan path, the scan data indicating a distance between the laser line scanning sensor and the workpiece at a set of positions along the scan path, thereby representing a surface contour of the workpiece.

The vertical coordinate of the scan path further defines a field of view of the laser line scanning sensor. For example, at a first vertical coordinate locating the laser line scanning sensor one foot above a surface of the workpiece, the laser line scanning sensor can capture data within a first field of view. At a second vertical coordinate locating the laser line scanning sensor two feet above the surface of the workpiece, the laser line scanning sensor can capture data within a second field of view including a larger area of the workpiece than the first field of view. However, when the distance between the laser line scanning sensor and the workpiece is increased, the laser line scanning sensor captures data exhibiting decreased accuracy resolution.

4.2 Sensor Orientation

In one implementation, the set of scan parameters can include an orientation of the laser line scanning sensor. The system can further include: a pivot coupling the laser line scanning sensor to the robotic arm; and an actuator configured to set an orientation of the laser line scanning sensor about the pivot. For example, an orientation value of zero degrees corresponds to alignment of a central axis of the laser line scanning sensor with a vertical axis, while a 30° orientation value corresponds to a 30° pitch offset between the central axis of the laser line scanning sensor and the vertical axis. The laser line scanning sensor captures data defining a lowest error at an orientation wherein the laser line scanning sensor is normal to the surface of the workpiece. Therefore, the set of scan parameters defines an orientation of the laser line scanning sensor to maximize a surface area of the workpiece normal to the laser line scanning sensor for the specified scan path.

In one implementation, the orientation of the optical scanner can also affect an amount of external light (e.g., light not emitted by the laser line scanning sensor) captured by the laser line scanning sensor. For example, orienting the laser line scanning sensor to tilt toward a window through which natural light enters an environment including the system may increase an error of the data captured by the laser line scanning sensor, such as by overexposing photoreceptors of the laser line scanning sensor. Therefore, the set of scan parameters can define an orientation of the laser line scanning sensor configured to minimize interference by external light.

4.3 Actuation Velocity

The set of scan parameters can include an actuation velocity of the laser line scanning sensor. The actuation velocity defines a rate of actuation of the laser line scanning sensor by the robotic arm. For example, the set of scan parameters can include an actuation velocity of one foot per second, thereby allowing the system to complete an optical scan in 10 seconds for a path length of 10 feet. By increasing the velocity of actuation of the laser line scanning sensor, the system can decrease the duration of a scan and increase the error exhibited by data captured by the laser line scanning sensor.

For example, the optical scanner can exhibit a sampling rate capacity. To capture data for a scan exhibiting a high actuation velocity, the laser line scanning sensor can increase the rate of sampling to capture multiple data points along a surface of the workpiece. However, for a scan exhibiting a high velocity, the sampling rate t may exceed a sampling rate capacity of the laser line scanning sensor, resulting in incomplete data captured by the optical system. Additionally, increasing the actuation velocity of the optical scanner can increase a vibrational amplitude of the system, causing the laser line scanning sensor to shake and/or digress from the scan path, thereby resulting in increased error of the data captured. Therefore, the set of parameters can indicate an actuation velocity optimized to reduce scan duration while capturing data exhibiting a threshold error.

4.4 Exposure

In one implementation, the set of scan parameters includes an exposure value. The laser line scanning sensor includes an aperture configured to operate at: an open position in which light external the laser line scanning sensor enters a receptor region (e.g., an array of light receptors) of the laser line scanning sensor; and a closed position in which light external the laser line scanning sensor is blocked from the receptor region. The exposure value thereby specifies a duration that the aperture of the laser line scanning sensor occupies the open position to allow external light to reach the receptor region.

Increasing the exposure value of the set of scan parameters (e.g., increasing the open duration of the aperture) increases the amount of external light received by the receptor region. Thus, for a work zone within an environment with uneven external lighting (e.g., external lighting brighter in a first region of the work zone than a second region), the set of scan parameters can define a function of exposure values configured to optimize an amount of light received by the receptor region. For example, within the first region the set of scan parameters can define a first exposure value, and within the second region the set of scan parameters defines a second exposure value higher than the first exposure value.

The set of scan parameters can define a function of varying exposure values to capture scan data of a workpiece with regions including different surface features. For example, for a first region of a workpiece including a reflective feature, the set of scan parameters defines a low exposure value to decrease an amount of light reflected into the receptor region, and for a second region including a matte feature, the set of scan parameters defines a higher exposure value. The system can vary the exposure value to capture additional characteristics of a workpiece including varying colors, edges, and textures.

4.5 Light Wavelength

In one implementation, the laser line scanning sensor is a laser line scanning sensor configured to project a laser line onto the workpiece. The set of scan parameters can include a wavelength (e.g., a color) of the laser emitted. For example, for a workpiece including a matte region, the set of scan parameters can include a wavelength of the laser defining a red color. For a dark colored workpiece or reflective workpiece, the set of scan parameters can include a wavelength of the laser defining a blue color. Therefore, as described above, the set of scan parameters can define a function of laser wavelength values to capture high-accuracy scan data of a workpiece defining regions of varying features.

4.6 Sampling Rate and Density

The set of scan parameters can define values for sampling rate and sample density of the optical scanner. The sampling rate defines a frequency of data capture by the laser line scanning sensor, while the sample density defines a number of data points recorded by the laser line scanning sensor during each data capture. For example, for a laser line scanning sensor defining a laser line scanner, the laser line scanning sensor can project a six-inch-wide laser line onto the workpiece and capture seven data points along the laser line (e.g., one data point for per each inch of the laser line inclusive of line extremities) per second. In this example, the set of scan parameters defines: a sampling rate of one per second; and a sample density of one per inch or seven per second.

By increasing sampling rate and sample density, the system increases an accuracy of the scan data, thereby enabling the system to assemble a virtual model exhibiting an increased resolution with the scan data. However, increasing these parameters also increases a computational complexity of assembling the virtual model, which can increase a computational duration.

4.7 Active Area

The set of scan parameters can include an active area value defining the size of an area to be sampled during a single sampling instance. For the example described above, the six-inch-wide laser line defines the active area. By increasing the active area of a scan, the system can decrease the number of scans to generate a complete virtual model of the workpiece (e.g., by scanning a larger area of the part along each scan path of the scan). However, the extremities of the active area may exhibit increased error if the extremities are arranged at non-normal angles to the laser line scanning sensor (such as for a rounded part). Therefore, the system can generate a virtual model exhibiting an increased resolution by decreasing the active area and increasing the number of scans within a scan cycle.

5. Workpiece Scan

The method S100 includes: navigating an end effector over a workpiece; accessing a set of images captured by a laser line scanning sensor arranged on the end effector while traversing the workpiece; and compiling the set of images into a virtual model representing unloaded surfaces of the workpiece. Generally, the system can implement methods and techniques described in U.S. patent application Ser. No. 18/111,470 to: autonomously navigate a laser line scanning sensor (e.g., a depth sensor and/or a color camera) over the workpiece; capture optical images (e.g., depth maps, photographic color images) of the workpiece; and assemble these optical images into a virtual three-dimensional model that represents surfaces of the workpiece within a wide dimensional tolerance (e.g., +/−0.15").

For example, after the operator loads the workpiece into the work zone and confirms processing limits for the workpiece, the system can initiate a scan cycle. During the scan cycle, the system can: navigate the laser line scanning sensor—located on the end effector—along the scan path over and offset above the workpiece; monitor a distance between the end effector and the workpiece based on scan data collected by the laser line scanning sensor; and implement closed-loop controls to maintain a target offset distance between the laser line scanning sensor and the workpiece (e.g., 20", 50 centimeters). In this example, for a workpiece defining an elongated geometry including a long axis located approximately parallel to a longitudinal axis of the work zone, the system can actuate a conveyor supporting the robotic arm to traverse the robotic arm along the longitudinal axis of the work zone while rastering the end effector and the laser line scanning sensor laterally across the work zone to capture a sequence of optical images representing all surfaces of the workpiece accessible by a sanding head on the end effector.

The system can thus capture scan data—such as color photographic images, stereoscopic images, depth maps, and/or LIDAR images—from a set of laser line scanning sensors arranged on the end effector while traversing the end effector across (e.g., over, and not in contact with) the workpiece. For example, the system can capture depth maps at a rate of 2 Hz while traversing the end effector across the workpiece at a rate of three feet per second at a target offset distance of three feet between the end effector and the workpiece, which corresponds to a nominal sensor field of view of three feet by three feet and thus yields approximately 50% overlap between consecutive depth maps captured by the system during the scan cycle.

The system then compiles these optical images into a virtual three-dimensional model of the workpiece as described in U.S. patent application Ser. No. 18/111,470, such as by implementing structure-from-motion techniques or by fusing these optical images into the virtual model based on poses of the robotic arm when these optical images were captured. For example, the system can compile this set of optical images into a three-dimensional mesh within a virtual three-dimensional space.

However, the system can implement any other methods or techniques to navigate the end effector and laser line scanning sensor over the workpiece, to collect optical images of the workpiece, and to generate a virtual three-dimensional model of the workpiece based on these optical images.

The system can therefore execute Blocks of the method S100 to: autonomously capture scan data of a workpiece occupying a work zone during a contactless scan cycle; compile these scan data into a virtual three-dimensional model; and generate a toolpath spanning surfaces of the workpiece represented in the virtual model.

6. Baseline Scan Cycle

Shown in FIG. 1, the baseline scan cycle includes an exhaustive set of dozens or hundreds of scans. The scan data from the baseline scan cycle represents a ground truth of the surface contour of the first workpiece.

Generally, the baseline scan cycle includes executing a set of scans according to a set of baseline scan parameters associated with increased scan data accuracy. For example, the baseline scan cycle includes scan parameters such as a slowest actuation velocity value, a highest sampling rate, a highest sample density, and a smallest distance between the laser line scanning sensor and the workpiece. Therefore, the baseline scan cycle generates high-accuracy data assemblable into a high-resolution baseline virtual model.

In one implementation, during the baseline scan cycle, the system: sets an orientation of the laser line scanning sensor, an initial distance between the laser line scanning sensor and the workpiece, a sampling rate, an actuation velocity, and additional characteristics based on a set of baseline scan parameters; navigates the laser line scanning sensor linearly along a scan path specified by the baseline set of scan parameters at a constant speed and orientation; and captures a series of line scan images according to the sampling rate of the set of baseline scan parameters.

6.1 Assembling Scan Data into Virtual Model

In general, after capturing the scan data of the baseline scan cycle, the system assembles the scan data into a baseline virtual model. The system: accesses a series of scan data (line scan depth data, image depth data, two-dimensional depth maps) from the baseline scan cycle; based on position of laser line scanning sensor associated with each datapoint of the set of scan data, aligns the scan data into a mapping by calculating a set of computational transforms (e.g., transformation vectors and/or transformation matrices configured to locate each data point at a mapped position corresponding to the position of the laser line scanning sensor) to converge on a set of transforms that align the scan data with minimum geometric/spatial error between surfaces represented by surfaces in the scan data; and applies the set of transforms to compile the scan data into a 3D virtual model of the workpiece.

For example, the system can implement photogrammetry techniques to assemble line scan images or two-dimensional depth maps into a three-dimensional virtual model of the part based on the position and orientation of the laser line scanning sensor when each line scan image or depth map was captured by the laser line scanning sensor during the scan cycle.

In one implementation, the system: calculates a transform directly based on a position of the laser line scanning sensor when an image was captured; applies the transform exactly to the image to locate the image in the virtual environment; and repeats the transform calculation step for each other image captured during the scan cycle to create a virtual model or for a sequence of images captured during each other scan cycle—according to different scan parameters—to generate additional virtual models exhibiting different error characteristics (e.g., hole size, geometric error).

7. Additional Scan Cycles

After the system completes the baseline scan cycle and generates the baseline virtual mode, the system executes additional scans (via simulation and/or via the laser line scanning sensor) to capture scan data at varying scan parameters.

Generally, the system: executes additional scan cycles to capture scan images according to a set of scan parameters; assembles the scan data into virtual models exhibiting different error characteristics; characterizes error in each virtual model; and adjusts (or "tunes") scan parameters for subsequent scan cycles based on error characteristics of virtual models generated with data from preceding scan cycle(s).

In one implementation, the system executes a set of scans according to sets of "bookend" parameters. For example, the system can execute a first scan according to a first set of scan parameters associated with a lower resolution than another set of scan parameters, such as high actuation velocity, low sampling rate, and a large distance between the laser line scanning sensor and the workpiece. The system can then execute a second scan according to a second set of scan parameters associated with a higher resolution than the first set of scan parameters such as a lower actuation velocity, a higher sampling rate, and a lower distance between the laser line scanning sensor and the workpiece then the first set of scan parameters. The system then: generates a first virtual model based on scan data from the first scan; generates a second virtual model based on the scan data from the second scan; evaluates the first and second virtual models for error including holes (e.g., absence of data) and/or geometric error; and generates a third set of scan parameters predicted to generate a set of scan data exhibiting a threshold error metric. For example, in response to the first scan resulting in a virtual model exhibiting an error metric above the threshold error and the second scan resulting in a second virtual model exhibiting an error metric below the threshold error, the system generates a third set of scan parameters defining values between the first and second set of scan parameters (e.g., a third actuation velocity lower than the actuation velocity of the first set of scan parameters and higher than the actuation velocity of the second set of scan parameters). The system repeats the step described above to generate sets of scan parameters to converge on a set of scan parameters that occupies the threshold error.

In one implementation, during the baseline scan cycle the system executes scans across the range of possible scan parameters, such as by: during a first scan of the baseline scan cycle, maximizing each parameter value in the set of scan parameters; during a second scan of the baseline scan cycle, minimizing each parameter value in the set of scan parameters; and individually varying each scan parameter to derive a set of scan parameters that generates scan data with the highest resolution.

For example, the system can execute a scan according to a first set of scan parameters defining: a first scan path; a 0° orientation; and a one inch-per-second actuation velocity. The system can then execute a second scan according to a second set of scan parameters defining: the first scan path, the 0° orientation; and a 10 inch-per-second actuation velocity. The system can compare the scan data from the first scan to the scan data from the second scan and detect an error metric of the rapid (second) scan compared to the slow (first)

scan. The system can then execute scans along the same path with the same laser line scanning sensor orientation at activation velocities between one and ten inches-per-second. Therefore, during the baseline scan cycle, the system executes scans with different permutations of scan parameters to identify a range of scan parameters that yields scan data within a threshold resolution range.

7.1 Hole Detection

In one implementation, the system evaluates a series of scan data by assembling the scan data into a virtual model and detecting areas exhibiting an absence of data (e.g., a hole). The system can access a database of error parameters including hole thresholds (e.g., maximum hole width, length, area, density) and evaluate a virtual model to detect if the virtual model is below, within, or above the thresholds defined within the database.

In one implementation, the system stores the baseline virtual model as baseline (or "ground truth) geometry of the workpiece. In this implementation, the system: selects a second virtual model generated based on scan data captured during a subsequent scan cycle; aligns baseline and second virtual models in the virtual environment; and identifies a total absence of data quotient of the second virtual model compared to the baseline. The system can then: characterize each hole (e.g., each absence of data) proportional to the total absence of data; and calculate a normalized hole metric of the second virtual model by dividing total absence of data by total surface area (or volume) of the baseline (or second) virtual model. Therefore, the system quantifies an amount of missing data within the virtual model per unit area of the virtual model.

In a similar implementation, the system can: align the baseline and second virtual models in a virtual environment; segment the baseline virtual model into volumetric regions (or "slices"); and segment the second virtual model into corresponding volumetric regions. For each volumetric region pair in the baseline and second virtual models, the system calculates: a total absence of data; and a surface area (or volume) of the region. Therefore, the system derives a hole density for each region of the workpiece. In this implementation, if a particular volumetric region exhibits hole density greater than a threshold hole density, the system can tune scan parameters for a subsequent scan cycle to capture data predicted to yield a virtual model exhibiting reduced hole density within this particular region, such as by: decreasing actuation velocity of the laser line scanning sensor; decreasing offset distance between the laser line scanning sensor and the workpiece; and increasing sampling density. Conversely, if a particular volumetric region exhibits its hole density significantly less than the threshold hole density, the system can tune scan parameters for a subsequent scan cycle—executable in less time—to capture data predicted to yield a virtual model exhibiting increased regional geometric error within this particular region, such as by increasing actuation velocity of the laser line scanning sensor; increasing offset distance between the laser line scanning sensor and the workpiece; and decreasing sampling density.

In one variation, to detect a hole, the system: aligns the virtual model and the baseline virtual model; and detects a difference of the virtual model from the baseline virtual model defining an absence of data in the virtual model, the data present in the baseline virtual model.

In one implementation, in response to the first virtual hole defining a first dimension less than a threshold hole dimension, the system assigns the first set of scan parameters to the first workpiece region including the hole. The system can otherwise: fill the virtual hole in the virtual model with the data present in baseline virtual model data or interpolate scan data from the first series of scan data to generate a simulated datum within the first virtual hole.

In response to detecting a virtual hole greater than the threshold hole dimension, the system assigns a new set of scan parameters to the region of the workpiece including the hole, thereby initiating a new scan of the region including the hole with a set of scan parameters associated with a higher resolution than a resolution associated with the first set of scan parameters.

7.2 Geometric Error Detection

Generally, the system characterizes a geometric error of a virtual model compiled from a scan or scan cycle. The geometric error defines a geometric difference between the baseline virtual model of the workpiece and a subsequent virtual model of the workpiece. For example, the geometric error can include: dimensional errors wherein a dimension of the workpiece in the virtual model is different from the dimension of the workpiece in the baseline virtual model; and/or spatial errors wherein a surface of the virtual model defines a geometry (e.g., curvature) different from the geometry of the baseline virtual model.

In one implementation, in the absence of a CAD model, the system: stores the baseline virtual model as baseline (or "ground truth") geometry of workpiece. In this implementation, to characterize geometric error, the system: selects a second virtual model generated based on scan data captured during subsequent scan cycles; aligns baseline and subsequent virtual models in the virtual environment; calculates a total volume between surfaces of the baseline and subsequent virtual models; characterizes a total geometric error of a subsequent virtual model proportional to this total volume; and calculates normalized geometric error of the second virtual model by dividing total geometric error by total surface area (or volume) of the baseline (or subsequent) virtual model.

In a similar implementation, the system: aligns the baseline and subsequent virtual models in the virtual environment; segments the baseline virtual model into volumetric regions (or "slices"); and segments the subsequent virtual model into corresponding volumetric regions. For each volumetric region pair in the baseline and subsequent virtual models, the system: calculates a total volume between surfaces of the volumetric region pair in the baseline and subsequent virtual models; characterizes a total regional geometric error of the volumetric region of the subsequent virtual model proportional to this total volume; and calculates a normalized regional geometric error of the volumetric region of the subsequent virtual model by dividing total regional geometric error by total surface area (or volume) of the volumetric region in the baseline (or subsequent) virtual model (thereby generating a one-dimensional distance value quantifying the geometric error).

In this implementation, the system can iteratively redefine the volumetric regions in order to isolate volumetric regions exhibiting more consistent, more uniform, or lower variance normalized regional geometric errors. For example, if a particular volumetric region exhibits normalized regional geometric error greater than a threshold error (e.g., 0.5"), the system can tune scan parameters for a subsequent scan cycle to capture data predicted to yield a virtual model exhibiting reduced regional geometric error within this particular region, such as by: decreasing actuation velocity of the laser line scanning sensor; decreasing offset distance between the laser line scanning sensor and the workpiece; and increasing sampling density. Conversely, if a particular volumetric region exhibits normalized regional geometric error less than a threshold error (e.g., 0.5"), the system can tune scan parameters for a subsequent scan cycle—executable in less time—to capture data predicted to yield a virtual model exhibiting increased regional geometric error within this particular region, such as by increasing actuation velocity of the laser line scanning sensor; increasing offset distance between the laser line scanning sensor and the workpiece; and decreasing sampling density.

7.2.1 Surface Error

In a similar implementation, the system: aligns the baseline virtual model and subsequent virtual model in the virtual environment; segments the baseline virtual model into surface regions; and segments the subsequent virtual model into corresponding surface regions. For each surface region pair in the baseline virtual model and subsequent virtual model, the system then: calculates a total volume between surfaces of the surface region pair in the baseline virtual model and subsequent virtual model; characterizes a total surface geometric error of the surface region of the subsequent virtual model proportional to this total volume; and calculates a normalized surface geometric error of the surface region of the second virtual model by dividing total regional geometric error by total area of the surface region in the baseline (or subsequent) virtual model.

In this implementation, the system can iteratively redefine the surface regions to isolate surface regions exhibiting more consistent, more uniform, or lower-variance surface geometric errors. For example, if a particular surface region exhibits surface geometric error greater than a threshold error (e.g., 0.5"), the system can tune scan parameters for a subsequent scan cycle to capture data predicted to yield a virtual model exhibiting reduced surface geometric error within this particular region, such as by: decreasing actuation velocity of the laser line scanning sensor; decreasing offset distance between the workpiece and the laser line scanning sensor; and increasing sampling density. Conversely, if a particular surface region exhibits surface geometric error much less than a threshold error (e.g., 0.5"), the system can tune scan parameters for a subsequent scan cycle—executable in less time—to capture data predicted to yield a virtual model exhibiting increased surface geometric error within this particular region.

7.3 Scan Parameter Generation for Next Scan

After executing a scan (via simulation or the laser line scanning sensor) according to a first set of scan parameters, the system generates a second set of scan parameters, based on the previous virtual model compiled from the scan data corresponding to the first set of scan parameters.

In one implementation, the system adjusts or "tunes" a new set of scan parameters for individual regions or surfaces of the workpiece to: reduce a scan duration for workpiece regions represented with low geometric error in the previous virtual model; capture higher-resolution, higher-density, and/or higher-accuracy scan data within workpiece regions represented with high geometric error in the previous virtual model; and assemble these scan parameters into a sequence of scan parameters cospatial with corresponding regions of the workpiece. Then, the system can implement methods and techniques described above to: execute a scan cycle according to the sequence of scan parameters; assemble the resulting scan data into a virtual model; characterize error (e.g., holes, geometric error) in regions of the workpiece based on the virtual model; and refine workpiece region definitions and scan parameters assigned to each workpiece based on errors in these regions.

7.3.1 Scan Parameter Iteration

The system can access a database of error parameters defining a set of error thresholds associated with a specific workpiece. For example, the database of error parameters can include: a maximum hole density; maximum hole width; maximum hole length; a maximum total area of holes; and/or a maximum distance between a data point of a virtual model and a corresponding data point of the baseline virtual model. The system can define the set of error parameters based on operator input or based on previous scan data captured by the system (e.g., scan data for previous workpieces).

The system can repeat the steps described above to generate a set of scan parameters resulting in a virtual model exhibiting: a frequency of holes proximal and less than a maximum density (e.g., 25% hole area); holes of maximum dimension proximal and less than a maximum hole size (e.g., 45-50% of sanding pad diameter); and a dimensional error proximal and less than a maximum dimensional error (e.g., of 0.5"). The system then saves the set of scan parameters for this scan cycle as scan protocol for subsequent workpieces defining the same or similar geometry.

Alternatively, the system can repeat the foregoing processes to iteratively modify scan parameters to decrease a total scan cycle duration while maintaining a hole frequency, a hole size, and a dimensional error less than corresponding thresholds.

7.3.2 Scan Cycle Orientations

The system can additionally implement similar processes as described above to tune scan cycle parameters for additional scan cycles executed at additional laser line scanning sensor orientations necessary to capture scan data representing the entire workpiece.

Additionally or alternatively, the system can implement the foregoing processes to tune scan cycle parameters to capture data representing a larger proportion or area of the workpiece per scan cycle while maintaining hole frequency, hole size, and dimensional error less than corresponding thresholds, thereby enabling complete data capture of the workpiece with fewer scan cycles.

7.4 Reduced Computational Complexity of Additional Virtual Models

In one variation, during the tuning cycle, the system generates a virtual model for each scan. To decrease computational complexity and latency for generating each virtual model, the system can access the set of transforms from the baseline virtual model or other previous virtual models to locate each data point in the correct position corresponding to a position of the laser line scanning sensor when the data point was captured.

For example, the system: accesses a set of scan data of a workpiece; accesses a stored set of transforms (e.g., maps, transformation matrices) associated with the workpiece; generates an initial mapping of the scan data within a three-dimensional space via the set of transforms; and generates a virtual model from the scan data based on the initial mapping. Therefore, the system reduces computational complexity and system latency by re-using previously calculated transforms.

7.5 Workpiece Segmentation for Scan Parameter Tuning

In one implementation, during a tuning cycle, the system: segments the workpiece into regions; and derives a set of scan parameters for each region based on characteristics of the region. For example, based on the baseline virtual model, the system can detect regions of varying characteristics such as geometry, texture, color, and reflectivity. Based on the characteristics of the workpiece, the system segments the workpiece to separate regions defining different characteristics and generates scan parameters based on the characteristics of each region to generate scan data to compile into a virtual model of the workpiece defining a threshold resolution.

For example, the system can: execute a scan across multiple regions of the workpiece according to a first set of scan parameters; and compile the set of scan data into a virtual model. For a first region of the workpiece, the virtual model may exhibit a hole dimension and error metric within the hole and error thresholds. Therefore, the system assigns the first set of scan parameters to the first region of the workpiece. However, for a second region of the workpiece defining different characteristics (e.g., color, texture, geometry) than the first region, the virtual model may exhibit a hole dimension and error significantly less than the corresponding thresholds. Therefore, the system generates ("tunes") a second set of scan parameters for the second region defining a high actuation velocity and/or lower sample rate than the first set of scan parameters. Conversely, for a third region defining different characteristics than the first and second regions of the workpiece, the virtual model generated according to the first set of scan parameters may exhibit a hole dimension above the hole dimension threshold. Therefore, the system generates a third set of scan parameters "tuned" to decrease the hole dimension by decreasing the actuation velocity and/or increasing the sampling rate.

In one implementation, the system segments the workpiece into workpiece regions, such as based on: geometries of the workpiece represented in the virtual model; dimensional tolerance width; and/or geometry specification or tolerance width. In another implementation, the system segments the workpiece by discrete surface contour, such as defined by edges or by geometric or dimensional callouts in the target model. The system can then define a toolpath and assign a target force within each workpiece region.

For example, the system can: define a first workpiece region containing a contiguous convex surface; define a second workpiece region containing a contiguous concave surface; and define a third workpiece region containing a contiguous surface approximating a planar geometry (e.g., defining a large effective radius); etc.

In one implementation, the system assigns a set of scan parameters to each region of the workpiece, thereby executing one or more scans to capture scan data of each region. The system can additionally segment the workpiece during the baseline scan cycle and generate a scan protocol for each region of the workpiece. However, the system can segment the workpiece in any other way and according to any other workpiece characteristics.

8. Scan Simulation

In one implementation, the system can simulate scans based on existing scan data. The system can leverage scan simulations to reduce a duration of generating the scan protocol, such as by reducing a total active time of the laser line scanning sensor traversing the workpiece.

8.1 Virtual Environment Simulation

In one implementation, the system generates a virtual environment approximating the physical environment of the work zone, such as including locations, geometries, materials, and/or reflectivities of fixed surfaces around the work zone and lighting conditions around the work zone. For example, for a work zone proximal a window and under a fluorescent light, scan data captured by the depth sensor during a scan cycle may include solar and fluorescent light noise. Accordingly, the system can generate a virtual model that represents these ambient lighting conditions such that simulated scan data generated by the system during simulated scan cycles of the workpiece—within the virtual environment—represent such solar and fluorescent light noise. The system can further adjust (e.g., iteratively "tune") the virtual environment to return simulated scan data approximating or matching real scan data captured by the system when executing a real scan cycle on the workpiece.

For example, the system can: import a virtual model of the workpiece (e.g., the baseline virtual model, a CAD model of the workpiece) into the virtual environment; populate the virtual environment with virtual surfaces; simulate a scan cycle on the virtual model within the virtual environment based on scan cycle parameters executed during the real scan cycle; detect differences between these simulated and real scan data; and iteratively adjust the locations, geometries, materials, and/or reflectivities of the virtual surfaces in the virtual environment and re-simulate the scan cycle on the virtual model until the simulated scan data approximate the real scan data for these scan parameters.

The system can thus normalize the virtual environment by tuning surfaces and lighting conditions represented in the virtual environment to return simulated scan data approximating or matching real scan data for the workpiece when the system simulates a scan cycle with real scan parameters executed by the system during the real scan cycle.

The system can implement similar methods and techniques to tune the virtual environment to return simulated scan data similar or identical to real scan data generated by the system during other real scan cycles according to other scan parameters. For example, the system can implement methods and techniques described above to: execute a set of real scan cycles with a range of different scan parameters over a moderate time duration (e.g., one minute, ten minutes, one hour) rather than a long time duration (e.g., twelve hours); load a three-dimensional representation of the workpiece (e.g., the baseline virtual model, a CAD model of the workpiece) into the virtual environment; populate the virtual environment with virtual surfaces; simulate the set of scan cycles on the virtual model within the virtual environment based on scan cycle parameters executed during these real scan cycles; detect differences between these simulated and real scan data; and iteratively adjust the locations, geometries, materials, and/or reflectivities of the virtual surfaces in the virtual environment and re-simulate these scan cycles on the virtual model until these simulated scan data approximate corresponding real scan data for each set of scan parameters.

The system can then transition to simulating scan cycles on the workpiece under different simulated scan parameters within the virtual environment in order to define the scan protocol, as described above. For example, the system can interface with multiple machines (e.g., processing units) to simulate scan cycles with multiple different scan parameters in parallel in order to reduce total simulation time and to converge on a scan protocol in less time.

The system can then execute a scan cycle according to this scan protocol on the same workpiece, generate a toolpath for the workpiece based on these scan data, and process the workpiece accordingly. The system can then implement this same scan protocol for a next workpiece defining a similar geometry.

Alternatively, the system can repeat the foregoing process to: execute one real scan cycle on the second workpiece; import a CAD model of the second workpiece into the virtual environment; tune the virtual environment according to real scan data from the real scan cycle; simulate additional scan cycles on the second workpiece within the virtual environment; generate a second scan protocol for the second workpiece based on these simulate scan data; and execute the second scan protocol on the second workpiece.

Yet alternatively, the system can repeat the foregoing process to: execute a real baseline scan cycle and a real second (and additional) scan cycle on the second workpiece; generate a virtual model of the second workpiece based on baseline scan data; import the virtual model of the second workpiece into the virtual environment; tune the virtual environment according to real scan data from the real second (and additional) scan cycle(s); simulate additional scan cycles on the second workpiece within the virtual environment; generate a second scan protocol for the second workpiece based on these simulate scan data; and execute the second scan protocol on the second workpiece.

8.1.1 Example

For example, the system can: drive the set of actuators to traverse the laser line scanning sensor along the scan axis through an environment including the work zone and defining external lighting characteristics; and access a computer-aided-design model of the workpiece. The system then: assembles a first series of scan data from the laser line scanning sensor into a virtual environment approximating the external lighting characteristics of the environment including the work zone, based on the computer-aided-design model; accesses a second series of scan data captured by the laser line scanning sensor along the scan axis over the first workpiece, according to a second set of scan parameters; and simulates a virtual scan of the first workpiece defining the second set of scan parameters within the virtual environment to derive a first series of virtual scan data.

In response to the first series of virtual scan data exhibiting a difference from the second series of scan data, the system can modify the virtual environment (e.g., initialize a new virtual light source or changes the position of a virtual light source within the virtual environment). In response to the first series of virtual scan data approximating the second series of scan data, the system: verifies the virtual environment; and simulates a virtual scan of the first workpiece in the virtual environment according to a third set of test parameters.

Therefore, the system can: generate a virtual environment; render a baseline model or a CAD model within the virtual environment; and simulate scans within the baseline scan cycle without driving the robotic arm to actuate the laser line scanning sensor along a scan path.

8.2 Real-Time Scan Protocol Tuning

In one implementation, the system can leverage simulated scans to correct a scan protocol in real-time. During scanning and processing of a set of workpieces, the external environment around the system may exhibit geometric and lighting changes. For example, an intensity of light coming through a window in the virtual environment may increase or decrease over the duration, thereby changing an intensity of light in the environment. As a result, the laser line scanning sensor may capture scan data exhibiting increased error. The system can therefore: simulate the scan protocol within a virtual environment to generate simulated scan data; generate a set of tuned scan parameters for the scan protocol, based on a difference of the simulated scan data from the actual scan data; and execute the scan protocol according to the tuned set of scan parameters.

In one implementation, the system: executes a previously generated scan protocol by actuating the robotic arm to traverse the laser line scanning sensor around a workpiece in the work zone; accesses an expected error (and/or holes) of the real scan protocol data based on previous scan protocol cycle data from a workpiece defining the same geometry; and characterizes the error (and/or holes) of the real scan protocol data captured according to the set of parameters defined by the scan protocol. In response to the error of the real scan protocol data exceeding an error threshold (e.g., an error threshold defined in the database of error parameters or an error threshold defined as one standard deviation above the mean error of scan protocol data from previous workpieces defining the common geometry), the system: simulates the scan protocol within the virtual environment; tunes the virtual environment to generate simulated scan protocol data approximating the real scan protocol data; and simulates additional scans in the tuned virtual environment to converge on a new set of scan parameters configured to minimize the scan protocol duration and reduce the error of the scan protocol data to within the error threshold.

For example, due to an increase of natural light in the external environment during a scan protocol of a 23rd workpiece defining a common geometry, the system can capture a set of scan protocol data exhibiting an error above the error threshold due to overexposure of photoreceptors of the laser line scanning sensor from the increased light intensity of the environment. In response to the error of the scan protocol data above the error threshold, the system: simulates the scan protocol within the virtual environment; and modifies the virtual environment to approximate the increased light intensity in the actual environment. The system can then simulate a set of scans with different scan parameters to converge on a new set of scan parameters defining an error within the error threshold. In this example, the system can generate a new set of scan parameters defining an exposure lower than the exposure of the first set of scan parameters to prevent overexposure of the photoreceptors and reduce error. The system can then execute the updated scan protocol according to the new set of scan parameters.

Therefore, the system can simulate a set of scans within a virtual environment to: generate updated scan protocol parameters based on the virtual environment; and maintain the scan data within a threshold error.

9. Variations on the Method for Input Conditions

In variations of the method S100, the system can execute different combinations or permutations of Blocks of the method S100 based on input conditions, extant workpiece data, and/or data capture results when during a scan cycle, etc.

9.1 Computer-Generated Virtual Model

In one implementation, the system can access a computer-aided-design (CAD) model instead of initiating a baseline scan cycle. For example, the system can: access an identifier of the workpiece; access a database of a set of computer-aided-design models representing workpieces; and, based on the identifier, access the computer-aided-design model corresponding to the first workpiece within the database.

In this example, the system can: access the CAD model; verify that the CAD model defines a resolution above a threshold resolution (e.g., defines a threshold data point density); execute a first scan of the workpiece via the laser line scanning sensor according to a first set of scan parameters; generate a virtual environment based on the scan data of the first scan; execute a second scan of the workpiece via the laser line scanning sensor according to a second set of scan parameter different from the first set of scan parameters; and simulate the results of the second scan according to the second set of scan parameters within the virtual environment. In response to the simulated scan data differing from the scan data of the second scan, the system modifies the virtual environment and executes an additional scan via the laser line scanning sensor to generate additional scan data to train virtual environment. In response to the simulated scan data matching the scan data of the second scan, the system verifies the virtual environment.

After the virtual environment is verified, the system can simulate scans according to scan parameters within the virtual environment, thereby decreasing an amount of energy consumed by the system to drive the robotic arm to actuate the laser line scanning sensor about the workpiece. The system can further simulate multiple scans in parallel to reduce a duration of generating the scan protocol and therefore increase efficiency of scanning and processing by the system.

Therefore, when the system can access a computer-generated virtual model of the workpiece, the system can decrease a computational complexity and latency of the method S100 by using the computer-generated model as the baseline virtual model, thereby capturing less scan data with the laser line scanning sensor for the baseline scan cycle.

10. Scan Protocol Generation

The system generates a scan protocol defining a set of scans configured to capture scan data representing the workpiece above a minimum threshold resolution and within a minimum time duration. For example, while the baseline scan cycle can define a duration of four hours to generate the baseline model exhibiting a plus-or-minus one millimeter resolution, the scan protocol cycle can define a duration of five minutes to generate a virtual model of the workpiece exhibiting a plus-or-minus one centimeter resolution.

To generate the set of scan parameters for the scan protocol, the system: evaluates the scan data from a set of scans in the tuning cycle; and executes the sequence of scans characterized by a lowest duration.

10.1 Scan Protocol Sequence

During the tuning cycle, the system compiles a set of scan parameters to the scan protocol. Then the system derives an optimal sequence (e.g., ordering) of scans, based on a scan path of each set of scan parameters.

For example, the system can order the set of scans paths within the scan protocol, such as to reduce a total distance traversed by the laser line scanning sensor during the scan protocol, reduce a number of orientations occupied by the laser line scanning sensor, and/or reduce a total scan protocol duration.

In one implementation, the system can combine a set of scan paths and a set of scan parameters into a single scan of the scan protocol cycle. For example, the system can combine two sets of scan parameters defining adjacent scan paths to generate a single continuous scan path along which the system captures scan data according to a first set of parameters within a first portion of the continuous scan path and captures scan data according to a second set of parameters within a second portion of the continuous scan path. Therefore, the system can drive the laser line scanning sensor to: traverse a first portion of the continuous scan path and capture scan data according to a first sampling rate and a first actuation velocity; and traverse a second portion of the continuous scan path and capture scan data according to a second sampling rate and a second actuation velocity.

Further, the system can assign a set of scan parameters to regions of the workpiece. For example. The system can define a continuous scan path for the scan protocol including a boustrophedonic path traversing: a first region according to a first set of scan parameters including red laser wavelength and a first actuation velocity; a second region according to a second set of scan parameters including a blue laser wavelength and a second actuation velocity greater than the first actuation velocity; and a third region according to a third set of scan parameters including a blue laser wavelength and the first actuation velocity. Therefore, the system can generate accurate scan data for different regions of the workpiece defining different texture, color, and/or reflectivity while reducing a number of "passes" the laser line scanning sensor traverses over the workpiece and/or reducing a duration of the total scan protocol cycle.

In one implementation, within a continuous (e.g., composite) scan, the system navigates the laser line scanning sensor within a single orientation and occupying a single vertical coordinate to normalize the scan data across the scan path.

10.2 Scan Protocol Execution

The system executes the scan protocol on each instance of a workpiece by: driving the set of actuators to traverse the first workpiece region of the workpiece according to the first set of scan parameters to generate a first minimal set of data representing the first workpiece region; and driving the set of actuators to traverse the second workpiece region of the second workpiece according to the second set of scan parameters to generate a second minimal set of data representing the second workpiece region. The system then: compiles the first minimal set of data representing the first workpiece region into a first virtual region of a virtual model; and compiles the second minimal set of data representing the second workpiece region into a second virtual region of the virtual model.

One variation of the method S100 includes: navigating an end effector over a workpiece; accessing a set of images captured by a laser line scanning sensor arranged on the end effector while traversing the workpiece; and compiling the set of images into a virtual model representing unloaded surfaces of the workpiece. Generally, the system can implement methods and techniques described in U.S. patent application Ser. No. 18/111,470 to: autonomously navigate a laser line scanning sensor (e.g., a depth sensor and/or a color camera) over the workpiece; capture optical images (e.g., depth maps, photographic color images) of the workpiece; and assemble these optical images into a virtual three-dimensional model that represents surfaces of the workpiece within a wide dimensional accuracy (e.g., +/−0.15").

For example, after the operator loads the workpiece into the work zone and confirms processing limits for the workpiece, the system can initiate a scan cycle. During the scan cycle, the system can: navigate the laser line scanning sensor—located on the end effector—along the scan path over and offset above the workpiece; monitor a distance between the end effector and the workpiece based on scan data collected by the laser line scanning sensor; and implement closed-loop controls to maintain a target offset distance between the laser line scanning sensor and the workpiece (e.g., 20", 50 centimeters). In this example, for a workpiece defining an elongated geometry including a long axis located approximately parallel to a longitudinal axis of the work zone, the system can actuate a conveyor supporting the robotic arm to traverse the robotic arm along the longitudinal axis of the work zone while traversing the end effector and the laser line scanning sensor laterally across the work zone to capture a sequence of optical images representing all surfaces of the workpiece accessible by a sanding head on the end effector.

The system can thus capture scan data—such as color photographic images, stereoscopic images, depth maps, and/or LIDAR images—from a set of laser line scanning sensors arranged on the end effector while traversing the end effector across (e.g., over, and not in contact with) the workpiece. For example, the system can capture depth maps at a rate of 2 Hz while traversing the end effector across the workpiece at a rate of three feet per second at a target offset distance of three feet between the end effector and the workpiece, which corresponds to a nominal sensor field of view of three feet by three feet and thus yields approximately 50% overlap between consecutive depth maps captured by the system during the scan cycle.

The system then compiles these optical images into a virtual three-dimensional model of the workpiece as described in U.S. patent application Ser. No. 18/111,470, such as by implementing structure-from-motion techniques or by fusing these optical images into the virtual model based on poses of the robotic arm when these optical images were captured. For example, the system can compile this set of optical images into a three-dimensional mesh within a virtual three-dimensional space.

However, the system can implement any other methods or techniques to navigate the end effector and laser line scanning sensor over the workpiece, to collect optical images of the workpiece, and to generate a virtual three-dimensional model of the workpiece based on these optical images.

11. Tool Path Generation

The system can further implement methods and techniques described in U.S. patent application Ser. No. 18/111,470 to define a toolpath within each region of the workpiece.

In one implementation, the system sets a first feed rate for the first region proportional to the target force assigned to the first region. The system also sets a first stepover distance between segments of a first toolpath for a first region of the workpiece: based on (e.g., proportional to) the target force assigned to this region of the workpiece; and/or proportional to a minimum radius within the first region of the workpiece. The system then: defines a serpentine or boustrophedonic toolpath within the first region of the workpiece according to the nominal stepover distance; and stores this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system can project the first toolpath onto the first region of the workpiece represented in the virtual model, which represents the workpiece in unloaded form. The system can then extract a three-dimensional position and normal vector of each vertex or other point on the first toolpath from the virtual model. Accordingly, the system can store the first toolpath as a first ordered sequence of keypoints: located on a first unloaded surface of the workpiece stored in (i.e., represented by) the virtual model; and contained within the first workpiece region.

In one variation, the system can iteratively adjust this first toolpath based on local radii of the workpiece along segments of the first toolpath. Additionally or alternatively, the system can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system can set a force greater than the nominal target force within a concave subregion of the workpiece and a target force less than the nominal target force within a convex subregion of the workpiece. The system can repeat this process for each other region of the workpiece.

Alternatively, the system can implement the foregoing methods and techniques to generate a single continuous toolpath spanning the entire workpiece (or an entire surface of the workpiece selected for autonomous processing by the system).

In one implementation, the system generates the first toolpath by: defining the first toolpath including a first ordered sequence of keypoints located on the third virtual model; and, for each keypoint in the first ordered sequence of keypoints, calculating a vector normal to the third virtual model at a location of the keypoint on the third virtual model and storing the vector in the keypoint. Navigating the sanding head across the first workpiece region according to the first toolpath and deviating the sanding head from the first toolpath includes: for a first keypoint in the first ordered sequence of keypoints, via the set of actuators, locating the sanding head at a first position intersecting the first keypoint and aligning an axis of the sanding head to a first vector contained in the first keypoint; and driving the sanding head, coaxial with the first vector, toward the workpiece to match force values, in the first sequence of force values read from the force sensor to the nominal target force.

In another implementation the system generates the toolpath by: identifying the first workpiece region, defining a convex surface profile, in the geometry of the workpiece; and generating the first toolpath defining a first continuous path across the first workpiece region of the workpiece. Then, during the processing cycle, the system detects a first sequence of positions of the sanding head traversing the first workpiece region by detecting the first sequence of positions of a reference point while the sanding head traverses the first workpiece region, the reference point located on a sanding pad mounted to the sanding head and coaxial with an axis of rotation of the sanding head.

12. Processing Cycle

In one implementation, the method S100 includes accessing a first sequence of force values output by a force sensor coupled to a sanding head arranged on the end effector during a processing cycle. Via the set of actuators coupled to the end effector, the system: navigates the sanding head across the first workpiece region according to the first toolpath; and, based on a first sequence of force values, deviates the sanding head from the first toolpath to maintain forces of the sanding head on the first workpiece region proximal the first target force.

Generally, the system can implement methods and techniques described in U.S. patent application Ser. No. 18/111,470 to autonomously navigate the sanding head along a toolpath (e.g., a sequence of keypoints) defined within a region of the workpiece and to maintain a target normal force between the sanding head and the workpiece by selectively moving the sanding head into and away from the workpiece normal to the surface of the workpiece represented in the virtual model.

The system also implements closed-loop controls to maintain a target force between the sanding head and the workpiece within each workpiece region—based on force values read from the force sensor integrated into the sanding head—by driving the sanding head toward and away from the workpiece along vectors normal to the workpiece, such as represented in keypoints of these toolpaths or extracted from the virtual model during the processing cycle. For example, for a first keypoint in the first ordered sequence of keypoints, the system can drive the set of actuators to: locate the sanding head at a first three-dimensional position intersecting the first keypoint; align an axis of the sanding head to a first vector contained in the first keypoint; and drive the sanding head, coaxial with the first vector, toward the workpiece to match force values, in a sequence of force values read from the force sensor in the sanding head, to a first target force assigned to a first toolpath containing the first keypoint. The system can then drive the set of actuators to interpolate a three-dimensional path and sanding head orientation from the first keypoint to the second keypoint while implementing closed-loop controls to apply the sanding head to the workpiece with the first target force. The system can repeat this process for each other keypoint defined along the first toolpath and then along subsequent toolpaths defined for other regions of the workpiece.

In another implementation, the system defines a first ordered sequence of keypoints located on the virtual model. For each keypoint in the first ordered sequence of keypoints, the system: calculates a vector normal to the virtual model at a location of the keypoint on the virtual model; and stores the vector in the keypoint. The system then stores the first ordered sequence of keypoints as the first toolpath. Then, for a first keypoint in the first ordered sequence of keypoints, the system: locates the sanding head at a first position intersecting the first keypoint; aligns an axis of the sanding head to a first vector contained in the first keypoint; and drives the sanding head, coaxial with the first vector, toward the workpiece to match force values, in the first sequence of force values read from the force sensor, to the first target force.

In one implementation, during the processing cycle, the system: accesses a first sequence of force values output by a force sensor coupled to a sanding head arranged on an end effector; and, via a set of actuators coupled to the end effector, navigates the sanding head across the first workpiece region according to the first toolpath and based on the first sequence of force values, deviates the sanding head from the first toolpath to maintain forces of the sanding head on the first workpiece region proximal the first target force, and detects a first sequence of positions of the sanding head traversing the first workpiece region. The system then: interprets a first surface contour in the first workpiece region based on the first sequence of positions; accesses a first dimensional tolerance assigned to the first target surface defined in the target model; detects a first difference between the first surface contour and a first target surface, corresponding to the first surface contour, defined in the target model; and, in response to the first difference exceeding the first dimensional tolerance, generates a second toolpath for the first workpiece region. During a second processing cycle, via the set of actuators, the system: navigates the sanding head across the first workpiece region according to the second toolpath.

In one implementation, navigating the sanding head across the first workpiece region includes navigating the sanding head across the first workpiece region via the set of actuators including the robotic arm supporting the end effector and a sanding head, the sanding head including an orbital sander. The system accesses the first sequence of force values by accessing the first sequence of force values output by the force sensor arranged between the end effector and the sanding head.

13. Example

In one example the system can scan and sand a set of aircraft wing workpieces, each workpiece defining a common geometry (e.g., each aircraft wing defining approximately the same features, dimensions, and finishes).

The system generates a baseline model representing a high-accuracy surface contour of the aircraft wing geometry. To sand the set of aircraft wings to a consistent surface finish, the system generates a low-resolution virtual model of each workpiece and based on that virtual model, generates a unique toolpath for each workpiece.

For the first aircraft wing, the system: generates the baseline virtual model by capturing dozens or hundreds of scans of the wing and assembling the scan data into the baseline virtual model. In one implementation, the baseline model represents a surface contour of the workpiece with an accuracy of plus or minus one millimeter.

Once the baseline virtual model is generated, during a first scan cycle of the first workpiece, the system: drives the set of actuators of the robotic arm to traverse the laser line scanning sensor over the first aircraft wing secured in the work zone in Block S105; accesses a first series of scan data captured by the laser line scanning sensor, according to a first set of scan parameters, during the first scan; and assembles the first series of scan data into a first virtual model characterized by a first resolution, less than the baseline resolution in Block S110. For example, the first virtual model can define a surface contour of the aircraft wing with an accuracy of plus or minus one centimeter.

The system then evaluates the error of the first scan by checking the virtual model for holes. In response to detecting a first virtual hole, defining absence of scan data, in a first region of the first virtual model in Block S120, the first virtual hole defining a first dimension (e.g., a diameter) less than a threshold hole dimension (e.g., one centimeter), the system assigns the first set of scan parameters to the first workpiece region of the workpiece in Block S125. The system identifies that the first set of scan parameters generates scan data with a threshold accuracy (e.g., a smaller hole dimension than a maximum threshold hole dimension) and therefore assigns that set of scan parameters to that region. In this example, the system can assign the first set of scan parameters to a region of the aircraft wing characterized by a matte surface finish.

However, the aircraft wing may define a second region including a reflective surface that the laser line scanning sensor is unable to accurately capture scan data from according to the first set of scan parameters. Therefore, the system detects a second virtual hole, defining absence of scan data, in the second region of the first virtual model in Block S130. The system confirms absence of a second real hole in a second workpiece region of the workpiece by comparing the second region of the first virtual model with a corresponding region of the baseline model in Block 135. In response to the second virtual hole defining a second dimension greater than the threshold hole dimension, the system defines a second set of scan parameters in Block S140 and assigns the second set of parameters to the second region in Block S145. In this example, the second set of parameters are identified based on the baseline virtual model and configured to capture scan data of the reflective second region of the aircraft wing with a greater accuracy (e.g., a lower hole size) than the first set of parameters. The system repeats the steps above for each hole in the first virtual model. Then, the system compiles the first set of scan parameters for the first workpiece region and the second set of scan parameters for the second workpiece region into a scan protocol in Block S150, the scan protocol defining a scan cycle including a minimum number of scans executed within a minimum time duration to capture scan data of the aircraft wing and assemble a virtual model with a one centimeter accuracy. For example, the system can generate the baseline model of the aircraft wing in four hours by compiling and assembling a set of one hundred scans. The system can generate the virtual model associated with the scan protocol scan data within five minutes by compiling and assembling six scans.

Then, the system can execute the scan protocol on each of the other aircraft wings after the first aircraft wing to generate a virtual model of each of the aircraft wings in the set of aircraft wings. For example, during a scan cycle of a second aircraft wing, the system drives the set of actuators to traverse the laser line scanning sensor along the scan axis over the second aircraft wing according to the scan protocol in Block S155. The system: accesses a second series of scan data captured by the laser line scanning sensor, according to the first set of scan parameters while traversing the first workpiece region of the second aircraft wing workpiece in Block S160; accesses a third series of scan data captured by the laser line scanning sensor, according to the second set of scan parameters while traversing the second workpiece region of the second aircraft wing in Block S165; and assembles the second series of scan data and the third series of scan data into a virtual model of the second aircraft wing in Block S170 defining the plus or minus one centimeter accuracy. Finally, based on the virtual model of the second aircraft wing, the system generates a toolpath indicating a trajectory of a sanding head across the second workpiece in Block S175. The system then: executes a processing cycle according to the toolpath to sand the second aircraft wing; and repeats the steps above to scan and process the remaining aircraft wings.

14. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:

accessing a baseline virtual model, of a first workpiece loaded into a work zone, characterized by a baseline resolution;

during a first time period:

driving a set of actuators to traverse an optical sensor along a scan axis over the first workpiece; and via the optical sensor, capturing a first series of scan data according to a first set of scan parameters characterized by a first resolution less than the baseline resolution;

assembling the first series of scan data into a first virtual model of the first workpiece;

detecting a first virtual hole, defining absence of scan data, in a first region of the first virtual model;

in response to identifying absence of a real hole in the first region of the first workpiece, corresponding to the first virtual hole, based on the baseline virtual model:

defining a second set of scan parameters, for the first region, associated with a second resolution greater than the first resolution and less than the baseline resolution; and defining a scan protocol characterized by a second time period, less than the first time period, based on the first set of scan parameters and the second set of scan parameters;

executing the scan protocol by:

driving the set of actuators to traverse the optical sensor along the scan axis over a second workpiece, approximating the first workpiece, loaded into the work zone; and via the optical sensor:

capturing a second series of scan data according to the first set of scan parameters while traversing a second region on the second workpiece; and capturing a third series of scan data according to the second set of scan parameters while traversing a third region of the second workpiece, the third region of the second workpiece approximating the first region of the first workpiece and distinct from the second region on the second workpiece; and assembling the second series of scan data and the third series of scan data into a second virtual model of the second workpiece.

2. The method of claim 1:

further comprising:

detecting a second virtual hole, defining absence of scan data, in a fourth region of the first virtual model; and in response to the second virtual hole defining a dimension less than a threshold hole dimension, assigning the first set of scan parameters to the fourth region of the first workpiece;

wherein compiling the first set of scan parameters and the second set of scan parameters into the scan protocol comprises compiling the first set of scan parameters for the fourth region and the second set of scan parameters for the first region into the scan protocol, the scan protocol characterized by a target resolution based on:

the first resolution of the first set of scan parameters; and the second resolution of the second set of scan parameters;

wherein capturing the second series of scan data comprises capturing the second series of scan data according to the first set of scan parameters while traversing the second region on the second workpiece, the second region approximating the fourth region of the first workpiece; and wherein assembling the second series of scan data and the third series of scan data into the second virtual model comprises assembling the second series of scan data and the third series of scan data into the second virtual model of the second workpiece, the second virtual model characterized by the target resolution.

3. The method of claim 2:

wherein detecting the second virtual hole, defining absence of scan data, in the fourth region of the first virtual model comprises:

aligning the first virtual model and the baseline virtual model;

detecting a difference of the first virtual model from the baseline virtual model defining an absence of data in the first virtual model, the data present in the baseline virtual model; and defining the dimension of the second virtual hole based on the difference; and wherein assigning the first set of scan parameters to the fourth region of the first workpiece comprises, in response to the second virtual hole defining the dimension less than the threshold hole dimension:

filling the second virtual hole in the first virtual model based the data present in the baseline virtual model.

4. The method of claim 1:

wherein accessing the baseline virtual model comprises accessing the baseline virtual model, of the first workpiece approximating a workpiece geometry loaded into the work zone, characterized by the baseline resolution;

wherein driving the set of actuators, during the first time period, comprises driving the set of actuators to traverse a laser line scanning sensor along the scan axis over the first workpiece loaded into the work zone; and wherein driving the set of actuators, during execution of the scan protocol, comprises driving the set of actuators to traverse the laser line scanning sensor along the scan axis over the second workpiece, approximating the workpiece geometry, loaded into the work zone.

5. The method of claim 1:

wherein capturing the first series of scan data, during the first time period, comprises capturing the first series of scan data according to the first set of scan parameters comprising:

a first orientation of the optical sensor along the scan axis; and a first offset distance between the optical sensor and the first workpiece defining a first field of view of the first workpiece; and further comprising, during a baseline scan protocol preceding the first time period and characterized by a third time period greater than the first time period:

driving the set of actuators to traverse the optical sensor along the scan axis over the first workpiece loaded into the work zone; and via the optical sensor, capturing a baseline series of scan data according to a baseline set of scan parameters characterized by the baseline resolution, the baseline set of scan parameters comprising:

the first orientation of the optical sensor along the scan axis; and a baseline offset distance between the optical sensor and the first workpiece, less than the first offset distance, defining a baseline field of view, less than the first field of view.

6. The method of claim 1:

further comprising:

segmenting the first virtual model into a set of virtual regions; and for each virtual region in the set of virtual regions:

identifying a region characteristic exhibited by a region, in a set of regions of the first workpiece, corresponding to the virtual region; and wherein detecting the first virtual hole in the first virtual region comprises:

aligning a first virtual region, in the set of virtual regions, of the first virtual model with the first region, in the set of regions, corresponding to the first virtual region; and detecting a difference between the first virtual region of the first virtual model and the first region of the first workpiece, the difference defining an absence of data in the first virtual model, and the data present in the baseline virtual model.

7. The method of claim 6, wherein segmenting the first virtual model into the set of virtual regions comprises:

identifying the first region of the first workpiece characterized by a matte surface finish;

accessing a first subset of scan data, in the first series of scan data, corresponding to the first region of the workpiece;

assembling the first subset of scan data into the first virtual region;

detecting a fourth region of the first workpiece characterized by a reflective surface;

accessing a second subset of scan data, in the first series of scan data, corresponding to the fourth region of the first workpiece;

assembling the second subset of scan data into a second virtual region;

identifying a fifth region of the first workpiece comprising an array of bores;

accessing a third subset of scan data, in the first series of scan data, corresponding to the fifth region of the first workpiece; and assembling the third subset of scan data into the third virtual region defining a virtual representation of the array of fastener bores.

8. The method of claim 1:

further comprising generating a fourth series of scan data of the first workpiece according to a fourth set of scan parameters, the fourth series of scan data interpolated from the first series of scan data and the second series of scan data; and wherein compiling the first set of scan parameters and the second set of scan parameters into the scan protocol comprises, in response to the fourth series of scan data exceeding a threshold resolution:

compiling the first set of scan parameters, the second set of scan parameters, and the fourth set of scan parameters into the scan protocol.

9. The method of claim 1:

further comprising:

calculating a first error metric, defining differences between the first virtual model and the baseline virtual model, in a fourth region of the first virtual model;

in response to the first error metric of the fourth region less than an error threshold, assigning the first set of scan parameters to the fourth region of the first workpiece;

calculating a second error metric, differences between the first virtual model and the baseline virtual model, in a fifth region of the first virtual model; and in response to the second error metric of the fifth region greater than the error threshold, assigning the second set of scan parameters to the fifth region of the first workpiece; and wherein defining the scan protocol comprises compiling the first set of scan parameters for the fourth region of the first workpiece and the second set of scan parameters for the first region and the fifth region of the first workpiece into the scan protocol.

10. The method of claim 1:

wherein driving the set of actuators comprises driving the set of actuators to traverse the optical sensor along the scan axis over the first workpiece through an environment comprising the work zone and defining external lighting characteristics; and further comprising:

based on the baseline virtual model, assembling the first series of scan data into a virtual environment approximating the external lighting characteristics of the environment comprising the work zone;

accessing a fourth series of scan data captured by the optical sensor along the scan axis over the first workpiece, according to the second set of scan parameters;

simulating a virtual scan of the first workpiece defining the second set of scan parameters within the virtual environment to derive a first series of virtual scan data; and in response to the first series of virtual scan data different from the fourth series of scan data, modifying parameters of the virtual environment to adjust the first series of virtual scan data toward the fourth series of scan data.

11. The method of claim 1:

wherein executing the scan protocol comprises executing the scan protocol by:

driving the set of actuators to traverse the second region of the second workpiece according to the first set of scan parameters to generate a first minimal set of data representing the second region of the workpiece; and driving the set of actuators to traverse the third region of the second workpiece according to the second set of scan parameters to generate a second minimal set of data representing the third region of the second workpiece, the third region approximating the first region of the first workpiece; and wherein assembling the second series of scan data and the third series of scan data into the second virtual model comprises:

compiling the first minimal set of data representing the third region into a first virtual region of the second virtual model; and compiling the second minimal set of data representing the third region of the second workpiece into a second virtual region of the second virtual model.

12. The method of claim 1, wherein accessing the baseline virtual model of the first workpiece comprises accessing a first computer-aided-design model defining a three-dimensional representation of the first workpiece by:

accessing an identifier of the first workpiece;

accessing a database of a set of computer-aided-design models representing a set of workpieces; and based on the identifier, accessing the first computer-aided-design model, from the set of computer-aided-design models, corresponding to the first workpiece within the database.

13. The method of claim 1, further comprising:

generating a first toolpath representing a trajectory of a sanding head across the second workpiece based on a geometry of the second workpiece represented in the second virtual model;

accessing a nominal target force assigned to the first toolpath; and during a processing cycle following execution of the protocol scan:

accessing a first sequence of force values output by a force sensor coupled to the sanding head; and via the set of actuators:

navigating the sanding head across the second workpiece according to the first toolpath; and based on the first sequence of force values, deviating the sanding head from the first toolpath to maintain forces, applied by the sanding head to the second workpiece, proximal the nominal target force.

14. The method of claim 13, further comprising:

during the processing cycle, tracking a first sequence of positions of the sanding head traversing the first toolpath across the second workpiece;

interpreting a first surface contour of the first region of the second workpiece based on the first sequence of positions;

accessing a first dimensional tolerance assigned to the first region corresponding to the first surface contour represented in the second virtual model;

detecting a difference between the first surface contour and the first region corresponding to the first surface contour represented in the second virtual model;

in response to the difference exceeding the first dimensional tolerance, generating a second toolpath for the first region of the second workpiece; and during a second processing cycle following the first processing cycle, via the set of actuators, navigating the sanding head across the first region of the second workpiece according to the second toolpath.

15. The method of claim 13:

wherein navigating the sanding head across the second workpiece comprises navigating the sanding head across the second workpiece region via the set of actuators comprising:

a robotic arm;

an end effector arranged on a distal end of the robotic arm; and the sanding head coupled to the end effector and comprising an orbital sander; and wherein accessing the first sequence of force values comprises accessing the first sequence of force values output by the force sensor arranged between the end effector and the sanding head.

16. A method comprising:

during a first time period:

driving a set of actuators to traverse an optical sensor along a scan axis over the first workpiece;

via the optical sensor, capturing a first series of scan data according to a first set of scan parameters characterized by a first resolution;

assembling the first series of scan data into a first virtual model of the first workpiece;

calculating a first error metric, representing differences between the first virtual model and a baseline virtual model, in a first region of the first virtual model;

in response to the first error metric of the first region exceeding an error threshold:

defining a second set of scan parameters associated with a second resolution greater than the first resolution; and assigning the second set of scan parameters to the first region of the first workpiece;

defining a scan protocol characterized by a second time period, less than the first time period, based on the first set of scan parameters and the second set of scan parameters;

executing the scan protocol by:

driving the set of actuators to traverse the optical sensor along the scan axis over a second workpiece, approximating the first workpiece, loaded into the work zone; and via the optical sensor:

capturing a second series of scan data according to the first set of scan parameters while traversing a second region on the second workpiece; and capturing a third series of scan data according to the second set of scan parameters while traversing a third region of the second workpiece, the third region of the second workpiece approximating the first region of the first workpiece and distinct from the second region on the second workpiece; and assembling the second series of scan data and the third series of scan data into a second virtual model of the second workpiece; and generating a first toolpath for the second workpiece based on the second virtual model.

17. The method of claim 16:

further comprising:

detecting a second error metric, representing differences between the first virtual model and a baseline virtual model, in a fourth region of the first virtual model; and in response to the second error metric of the fourth region falling below the error threshold, assigning the first set of scan parameters to the fourth region of the first workpiece;

wherein defining the scan protocol comprises compiling the first set of scan parameters for the first region and the second set of scan parameters for the fourth region into the scan protocol, the scan protocol characterized by a target resolution based on:

the first resolution of the first set of scan parameters; and the second resolution of the second set of scan parameters;

wherein capturing the second series of scan data, via the optical sensor, comprises capturing the second series of scan data according to the first set of scan parameters while traversing the second region of the second workpiece, the second region approximating the fourth region of the first workpiece; and wherein assembling the second series of scan data and the third series of scan data comprises assembling the second series of scan data and the third series of scan data into the second virtual model of the second workpiece, the second virtual model characterized by the target resolution.

18. The method of claim 16:

wherein capturing the first series of scan data, during the first time period, comprises capturing the first series of scan data according to the first set of scan parameters comprising:

a first orientation of the optical sensor along the scan axis; and a first offset distance between the optical sensor and the first workpiece defining a first field of view of the first workpiece; and further comprising, during a baseline scan protocol preceding the first time period and characterized by a third time period greater than the first time period:

driving the set of actuators to traverse the optical sensor along the scan axis over the first workpiece loaded into the work zone; and via the optical sensor, capturing a baseline series of scan data according to a baseline set of scan parameters characterized by the baseline resolution, the baseline set of scan parameters comprising:

the first orientation of the optical sensor along the scan axis; and a baseline offset distance between the optical sensor and the first workpiece, less than the first offset distance, defining a baseline field of view, less than the first field of view.

19. The method of claim 16:

wherein driving the set of actuators comprises driving the set of actuators to traverse the optical sensor along the scan axis over the first workpiece through an environment comprising the work zone and defining external lighting characteristics; and further comprising:

based on the baseline virtual model, assembling the first series of scan data into a virtual environment approximating the external lighting characteristics of the environment comprising the work zone;

accessing a fourth series of scan data captured by the optical sensor along the scan axis over the first workpiece, according to the second set of scan parameters;

simulating a virtual scan of the first workpiece defining the second set of scan parameters within the virtual environment to derive a first series of virtual scan data; and in response to the first series of virtual scan data different from the fourth series of scan data, modifying parameters of the virtual environment to adjust the first series of virtual scan data toward the fourth series of scan data.

20. A method comprising:

prior to execution of a scan protocol:

driving a set of actuators to traverse an optical sensor along a scan axis over the first workpiece;

accessing a series of scan data captured by the optical sensor according to the first set of scan parameters characterized by a first resolution;

assembling the first series of scan data into a first virtual model of the first workpiece;

detecting a first virtual hole, defining absence of scan data, in a first region of the first virtual model;

in response to identifying absence of a real hole in the first region of the first workpiece, corresponding to the first virtual hole, defining a second set of scan parameters, for the first region, associated with a second resolution greater than the first resolution; and defining a scan protocol based on the first set of scan parameters and the second set of scan parameters; and executing the scan protocol by:

driving the set of actuators to traverse the optical sensor along the scan axis over a second workpiece, approximating the first workpiece, loaded into the work zone;

capturing a second series of scan data according to the first set of scan parameters while traversing a second region on the second workpiece;

capturing a third series of scan data according to the second set of scan parameters while traversing a third region of the second workpiece, the third region of the second workpiece approximating the first region of the first workpiece and distinct from the second region on the second workpiece; and assembling the second series of scan data and the third series of scan data into a second virtual model of the second workpiece.

* * * * *